(12) United States Patent
Lang et al.

(10) Patent No.: US 6,901,873 B1
(45) Date of Patent: Jun. 7, 2005

(54) LOW-DRAG HYDRODYNAMIC SURFACES

(76) Inventors: Thomas G. Lang, 417 Loma Large Dr., Salona Beach, CA (US) 92075; James T. Lang, 539 Homer Ave., Palo Alto, CA (US) 94301

( * ) Notice: Subject to any disclaimer, the term of this patent is extended or adjusted under 35 U.S.C. 154(b) by 0 days.

(21) Appl. No.: 09/852,616

(22) Filed: May 11, 2001

Related U.S. Application Data

(60) Continuation-in-part of application No. 09/689,698, filed on Oct. 13, 2000, now Pat. No. 6,439,148, which is a division of application No. 08/948,242, filed on Oct. 9, 1997, now Pat. No. 6,167,829.

(51) Int. Cl.[7] .............................. B63B 1/38; B63B 1/28
(52) U.S. Cl. ..................... 114/67 A; 114/61.1; 114/278; 114/280; 114/289
(58) Field of Search ............................. 114/67 A, 277, 114/278, 61.1, 61.12, 271–275, 280–282, 114/288–290; 244/204, 207–212

(56) References Cited

U.S. PATENT DOCUMENTS

| | | | | |
|---|---|---|---|---|
| 986,766 A | * | 3/1911 | Schroeder | .................... 440/44 |
| 1,003,364 A | | 9/1911 | Langston | |
| 1,050,517 A | * | 1/1913 | Chase | ........................ 114/290 |
| 1,121,006 A | | 12/1914 | Fauber | |
| 1,389,865 A | | 9/1921 | Fox | |
| 1,621,625 A | * | 3/1927 | Casey | ...................... 114/67 A |
| 3,044,432 A | | 7/1962 | Wennagel | |
| 3,109,495 A | | 11/1963 | Lang | |
| 3,199,484 A | | 8/1965 | Wiberg | |
| 3,203,389 A | | 8/1965 | Cale | |
| 3,467,043 A | | 9/1969 | Bowles | |

(Continued)

FOREIGN PATENT DOCUMENTS

JP 61081283 A * 4/1986 ............ B63B 1/38

(Continued)

OTHER PUBLICATIONS (No named author); *State-of-the-Art Investigation on Artificial Cavity Ships*; Project Report, Ship Hydrodynamic Division, Krylov Shipbuilding Research Institute; St. Petersburg, Russia, Feb. 2001; 70 pages.

*Primary Examiner*—S. Joseph Morano
*Assistant Examiner*—Ajay Vasudeva
(74) *Attorney, Agent, or Firm*—James Creighton Wray; Meera P. Narasimhan

(57) ABSTRACT

The invention relates to the use of gas cavities to reduce frictional drag on underwater surfaces such as hydrofoils, struts, fins, rudders, keels, propeller blades, ship hulls, underwater bodies, and wetted surfaces in general. Each gas-filled cavity is formed behind a discontinuity in the surface that causes the water boundary layer to separate from the surface. Gas is ejected into a region behind the discontinuity to fill the cavity; the gas can be air. If a cavity is open to the atmosphere, then air can typically fill the cavity naturally without air ejection. Cavities can either be closed or open. A low drag hydrofoil may have a closed cavity on one side, and an open cavity on the other side. For closed cavities, the underlying surface can be shaped to minimize cavity closure drag. Various ways to generate cavities, change hydrodynamic forces, and duct gas internally on hydrofoils and struts with cavities are covered. Different designs of hydrofoil boats, hydrofoil ships and ship hulls that are amenable to drag reduction are presented.

223 Claims, 12 Drawing Sheets

U.S. PATENT DOCUMENTS

| | | | |
|---|---|---|---|
| 3,504,649 A | | 4/1970 | Scherer |
| 3,595,191 A | * | 7/1971 | Grundy .................... 114/67 A |
| 3,688,723 A | | 9/1972 | Ulvesand et al. |
| 4,117,995 A | | 10/1978 | Runge |
| 4,165,703 A | | 8/1979 | Burg |
| 4,231,314 A | | 11/1980 | Peters |
| 4,706,910 A | * | 11/1987 | Walsh et al. ................. 244/130 |
| 4,708,085 A | | 11/1987 | Blee |
| 4,865,271 A | * | 9/1989 | Savill ......................... 244/130 |
| 4,930,729 A | * | 6/1990 | Savill ......................... 244/200 |
| 5,025,745 A | | 6/1991 | Wine |
| 5,026,232 A | * | 6/1991 | Savill ......................... 244/130 |
| 5,033,116 A | * | 7/1991 | Itagaki et al. .................... 2/67 |
| 5,069,403 A | * | 12/1991 | Marentic et al. ............ 244/130 |
| 5,133,516 A | * | 7/1992 | Marentic et al. ............ 244/130 |
| 5,176,095 A | | 1/1993 | Burg |
| 5,273,238 A | | 12/1993 | Sato |
| 5,359,951 A | * | 11/1994 | Meng ....................... 114/67 R |
| 5,390,624 A | | 2/1995 | Barnes |
| 5,415,120 A | | 5/1995 | Burg |
| 5,445,095 A | * | 8/1995 | Reed et al. ................ 114/67 A |
| 5,456,201 A | | 10/1995 | Bobst |
| 5,542,630 A | * | 8/1996 | Savill ......................... 244/200 |
| 5,570,650 A | | 11/1996 | Harley |
| 5,787,829 A | | 8/1998 | Oshima |
| 5,967,071 A | * | 10/1999 | Wipper ..................... 114/67 A |
| 6,092,766 A | * | 7/2000 | LaRoche et al. ............ 244/200 |
| 6,167,829 B1 | | 1/2001 | Lang |
| 6,345,791 B1 | * | 2/2002 | McClure ..................... 244/200 |
| 6,604,484 B2 | * | 8/2003 | Burg .......................... 114/274 |

FOREIGN PATENT DOCUMENTS

| | | |
|---|---|---|
| SE | 7025 | 11/1895 |

* cited by examiner

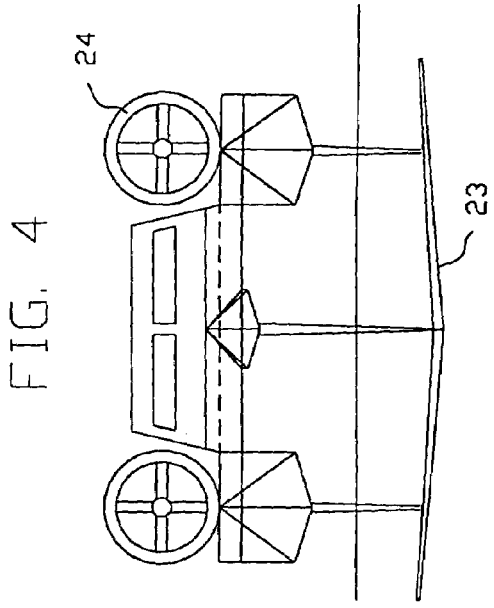
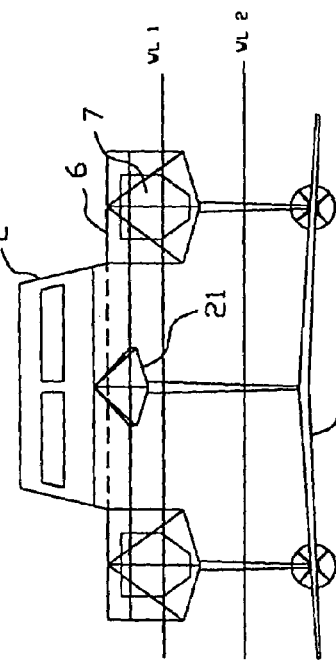
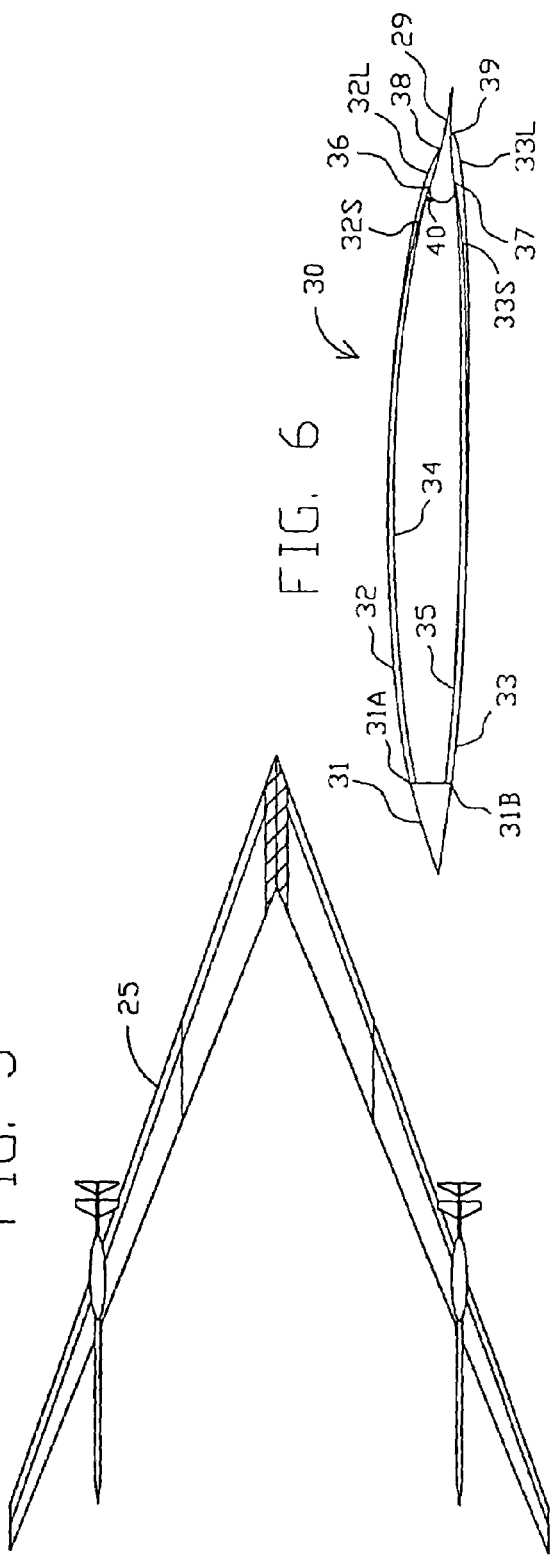

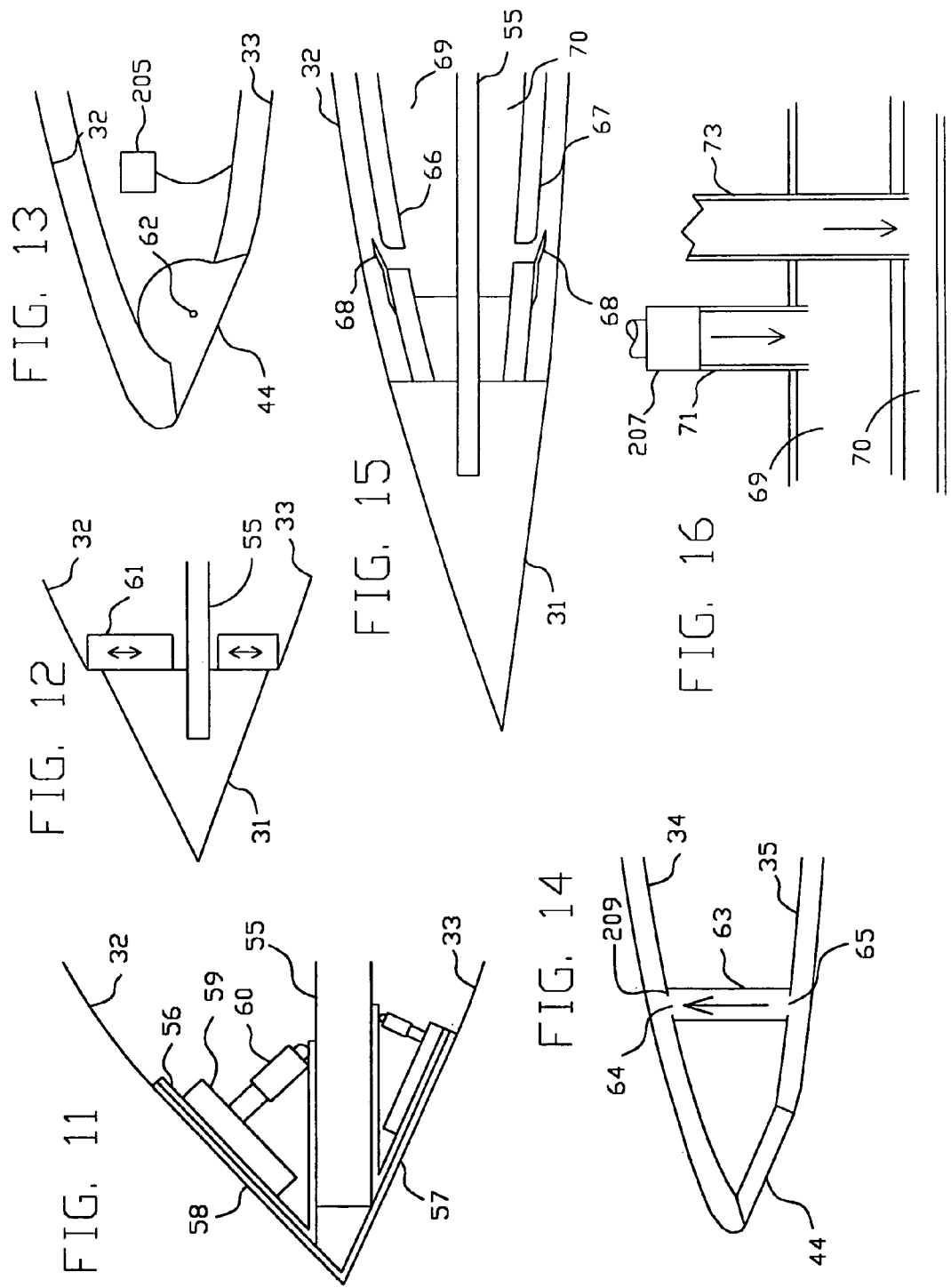

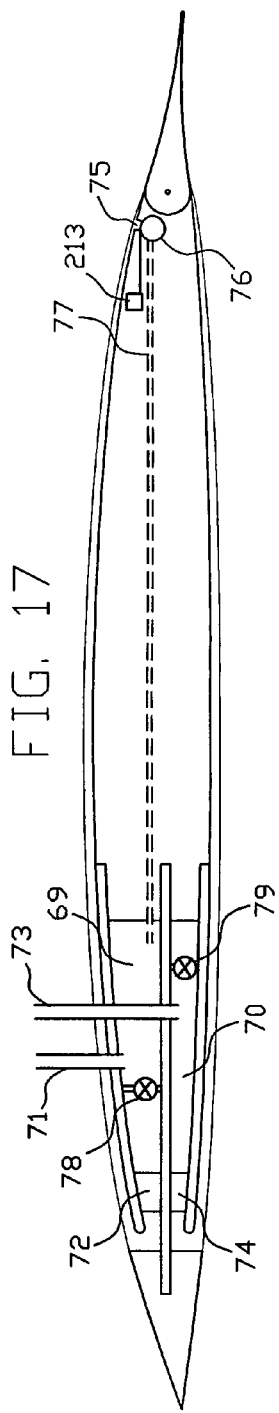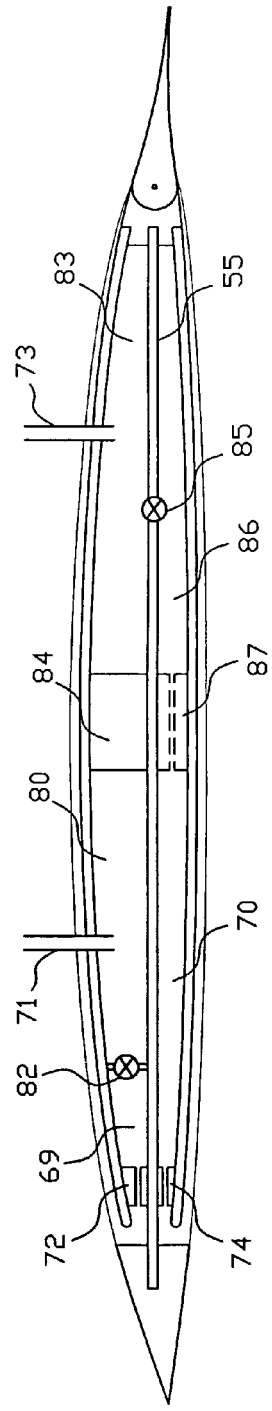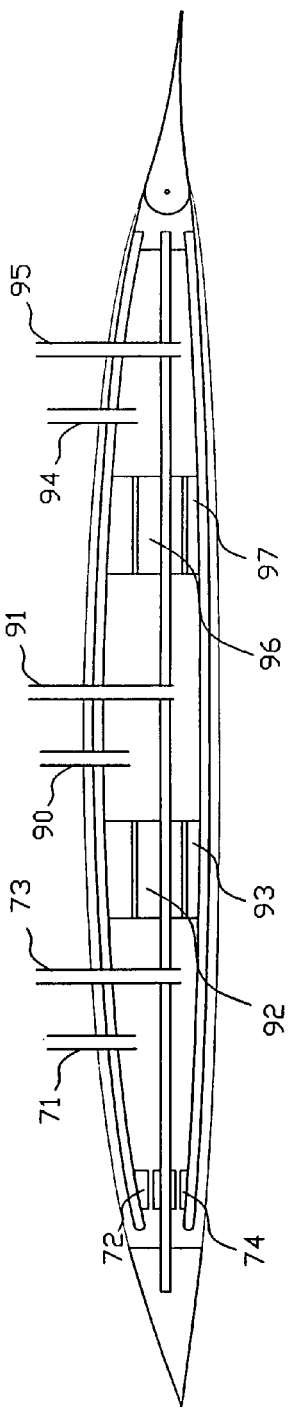

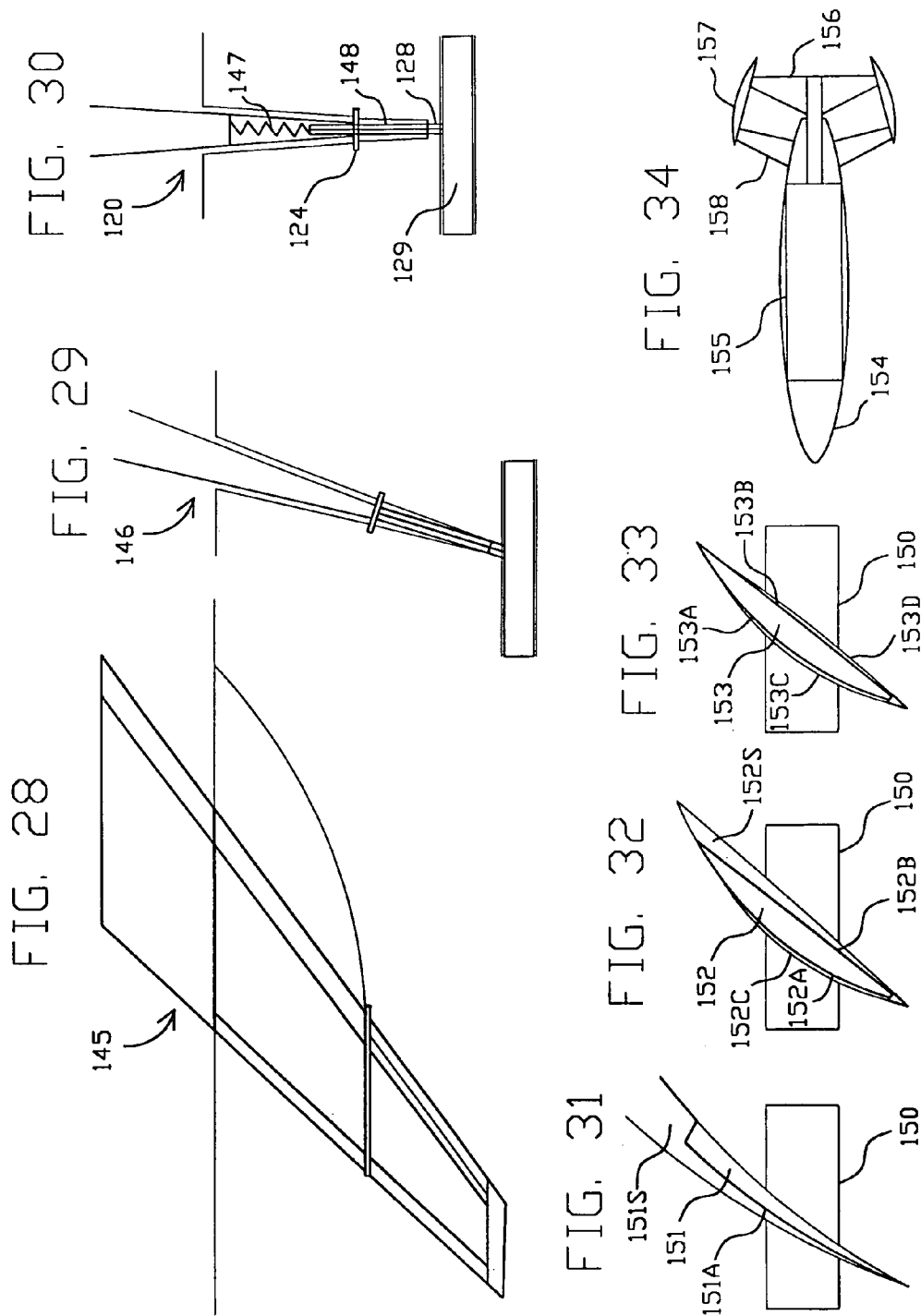

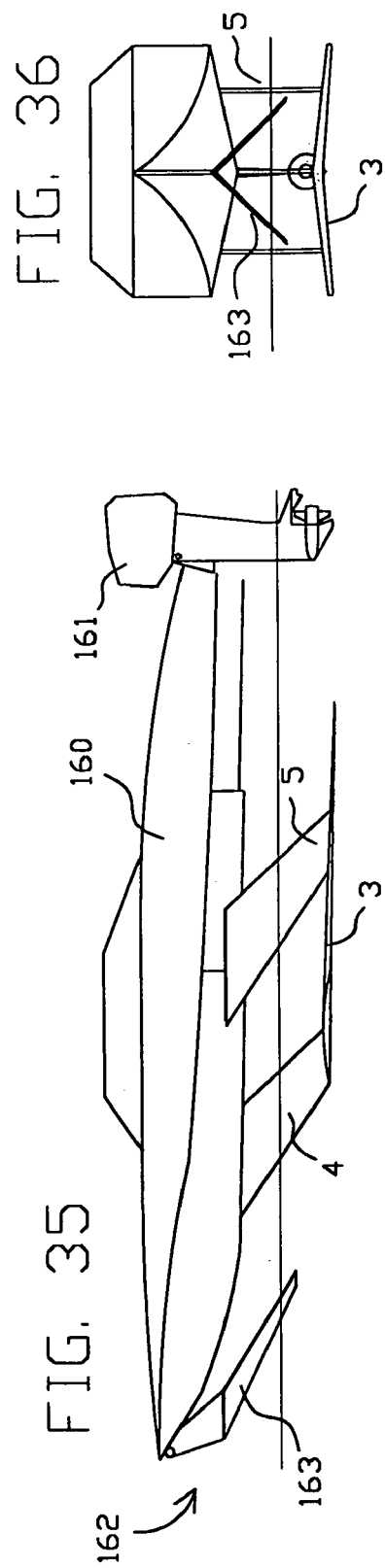
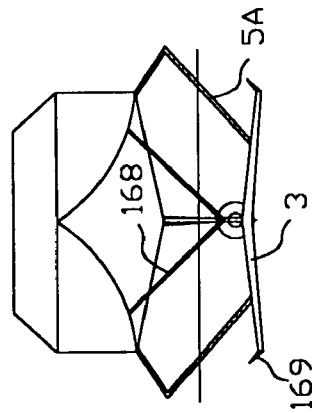
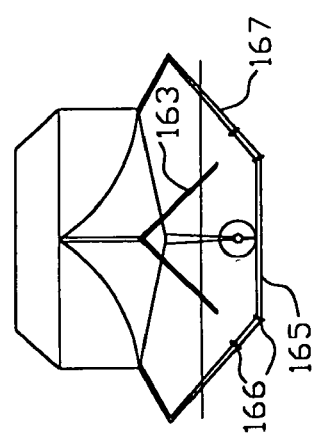
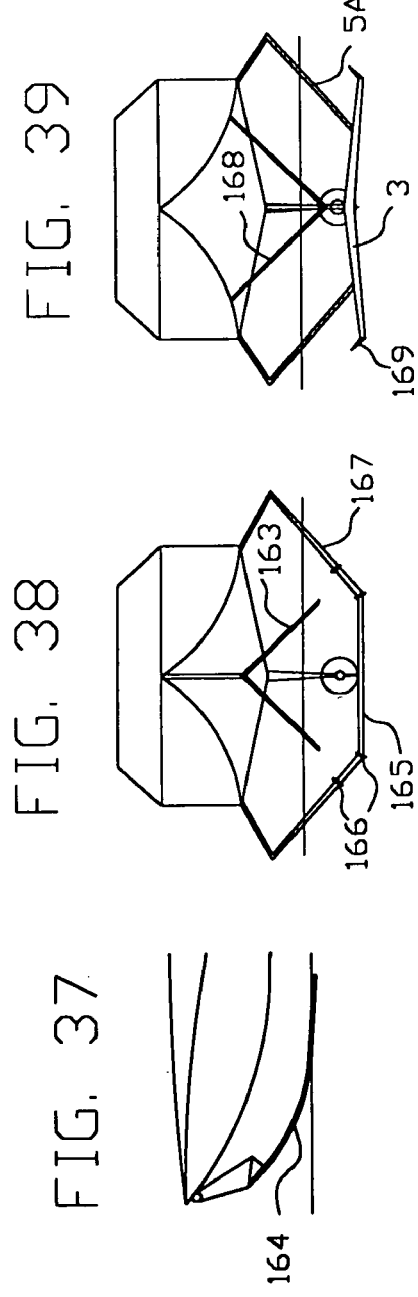

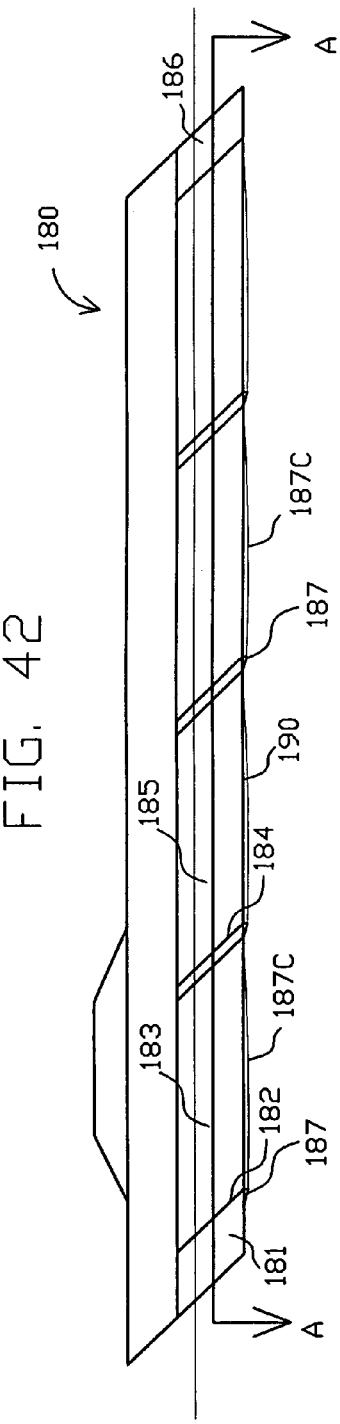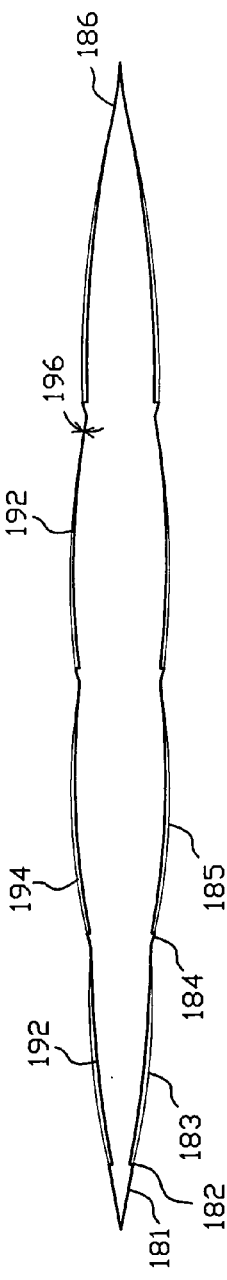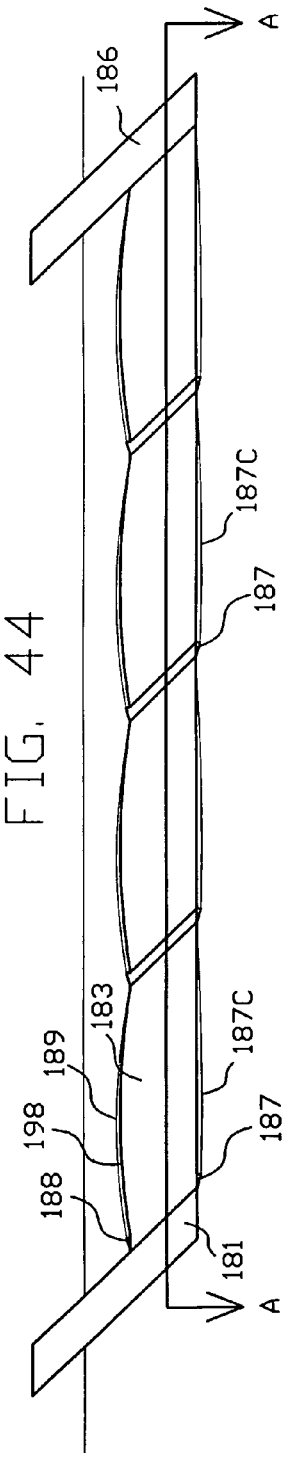

US 6,901,873 B1

LOW-DRAG HYDRODYNAMIC SURFACES

This is a continuation-in-part of U.S. application Ser. No. 09/689,698, filed Oct. 13, 2000, now U.S. Pat. No. 6,439,148 which is a division of U.S. application Ser. No. 08/948,242, filed Oct. 9, 1997, now U.S. Pat No. 6,167,829.

This invention was made with Government support under DAAH01-96-C-R228, and DAAH01-98-C-R115 awarded by the Defense Advanced Research Projects Agency. The Government has certain rights in certain claims of this invention.

BACKGROUND OF THE INVENTION

This invention applies to the field of hydrodynamics, and relates to the use of gas cavities to reduce the frictional drag of hydrofoil craft, ship hulls and underwater surfaces in general. Using cavities to reduce frictional drag is covered in U.S. Pats. No. 3,077,173 (1963) and No. 3,109,495 (1963) for base-vented and side-vented hydrofoils, U.S. Pat. No. 3,205,846 (1965) for torpedoes, and U.S. Pat. No. 6,167,829 (2001), together with a pending continuation of that patent, for submerged surfaces in general.

The reduction of frictional drag provides basic benefits: power is reduced, and fuel consumption is reduced. These benefits reduce the weight of a vessel, which further reduces power and fuel consumption compared with a fully wetted vessel designed for a given payload and range. Alternatively, vessel speed can be significantly increased with the same displacement, power, payload and range. Cost and time for payload delivery are greatly reduced by reducing drag.

The problem is how to design underwater surfaces to make full use of cavities to reduce drag. Needs exist for improved drag reduction in water craft.

SUMMARY OF THE INVENTION

A primary objective of this invention is to reduce the drag of high-speed hydrofoil craft by forming a closed gas cavity on each side of each lifting hydrofoil, forming an open cavity on each side of each support strut, and by covering at least one side of each propulsor blade with a cavity.

A preferred design is a hydrofoil craft that has one highly-swept-back v-hydrofoil in planform, supported by three swept struts, powered by two superventilating propellers wherein each drive shaft is located within a strut, and wherein the hydrofoil sweep back eliminates cavitation and reduces craft motion in waves.

Another objective is to efficiently control the lift of hydrofoil cross sections having closed cavities by using trailing edge flaps, optional leading edge flaps, and optional means for controlling gas flow rates.

Other objectives are to efficiently initiate cavities by introducing discontinuities to separate the water boundary layer in various ways, efficiently distribute the gas to each cavity, control the cavities, and separate adjacent cavities with different kinds of fences.

Still another objective is to minimize cavity drag on underwater surfaces by closing the cavities as smoothly as possible by minimizing the contact angle between the cavity and the surface. Another objective is to further minimize cavity drag by adding parallel ridges in the vicinity of cavity closure to reduce forward splash and thereby minimize gas entrainment out of the cavity.

Yet another objective is to use cavities to reduce the drag on all sides of ship hulls. Further objectives are covered in the description which includes the above and ongoing specification and claims.

BRIEF DESCRIPTION OF THE DRAWINGS

FIG. 3 is a front view of the craft.

FIG. 4 is a front view of a similar craft powered by shrouded air propellers.

FIG. 5 illustrates a hydrofoil with reverse sweep from that shown in FIG. 2.

FIG. 6 is a schematic cross section of a low drag hydrofoil with a tail flap, showing a cavity sensor, and two alternative closed cavities on each surface: a design cavity, and a slightly longer cavity.

FIG. 11 is a schematic detail of a wedge-shaped hydrofoil nose section with variable wedge angles.

FIG. 12 is a schematic detail of an alternative wedge-shaped hydrofoil nose section having a sliding block at each aft end to control cavity thicknesses.

FIG. 13 is a schematic detail of an angled-plate hydrofoil nose section with a variable plate angle.

FIG. 14 is a cross section of a nose region of a hydrofoil showing a means to duct gas from a cavity on one side into a cavity on the other side.

FIG. 15 is a cross section of a nose region of a hydrofoil showing flaps that cover gas ejection holes or slots.

FIG. 16 is a cross section at a strut-hydrofoil juncture showing how gas is delivered to different internal chambers in a hydrofoil.

FIG. 17 is a cross section of a hydrofoil showing methods for initiating cavities, moving gas from internal chambers into the cavities, removing gas from cavities, and for recycling the removed gas.

FIG. 18 is a similar cross section showing different ways to duct gas from a strut into internal ducts in a hydrofoil, and to move gas between different internal ducts within the hydrofoil.

FIG. 19 is a cross section of a hydrofoil showing how gas can be moved from several ducts in a strut into several ducts in a hydrofoil.

FIG. 28 is a side view of a strut that is swept down and forward.

FIG. 29 is a front view of an angled strut.

FIG. 30 is a cross section of a strut showing how a bottom portion of the strut, and an attached hydrofoil, can be spring loaded to reduce craft motion.

FIG. 31 shows a propeller hub with a cross section of a superventilating propeller blade.

FIG. 32 is a similar view showing a propeller blade that has a closed gas cavity on its suction side, and an open, superventilated cavity on its lower side.

FIG. 33 is a similar view showing a propeller blade that has a closed gas cavity on each side.

FIG. 34 is a cross section of a pod that encloses an electric motor which drives a shrouded propeller.

FIG. 35 is a side view of a hydrofoil boat hull supported above water by struts attached to a primary swept v-hydrofoil, together with a bow lifting device comprising an inverted, swept v-foil that provides pitch and roll stability.

FIG. 36 is a front view of the boat.

FIG. 37 is a side view of an alternative bow lifting device comprising parallel, flexible planing plates.

FIG. 38 is a front view of an alternative primary v-hydrofoil wherein the ends of the hydrofoil are canted upward to pierce the water surface to provide roll stability.

FIG. 39 is a front view of the main hydrofoil wherein the aft support struts are angled to provide roll stability, and the bow lifting device is a surface piercing v-hydrofoil in front view.

FIG. 42 is a side view of a ship hull showing multiple closed cavities on side and bottom surfaces.

FIG. 43 is a horizontal cross section of the ship hull showing the side cavities.

FIG. 44 is a side view of a ship hull that is mostly submerged, and has closed cavities on the side, bottom and top surfaces.

DETAILED DESCRIPTION OF THE PREFERRED EMBODIMENTS

Figure 1:
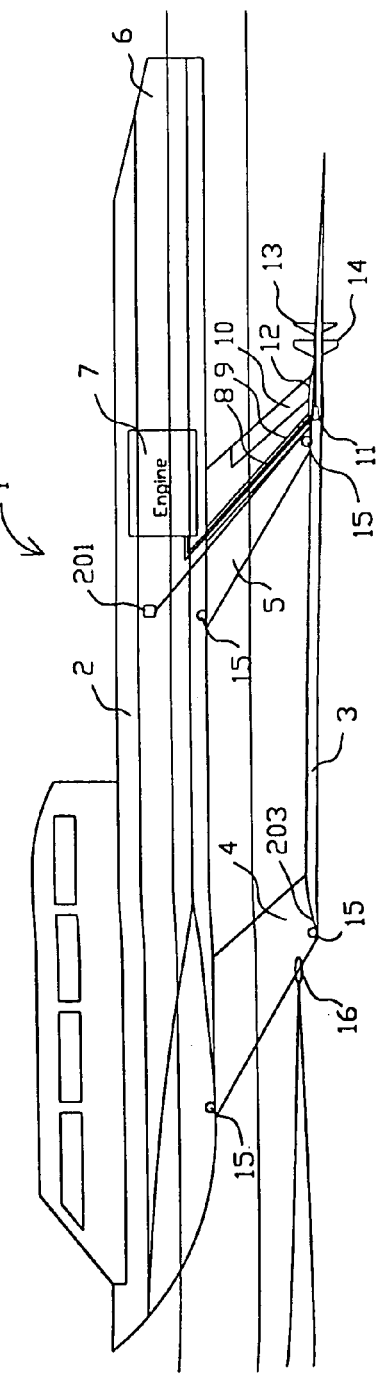
FIG. 1 is a schematic representation of the side view of a low-drag, high-speed hydrofoil craft showing an above-water hull, a hydrofoil, support struts and a propeller.
Figure 2:
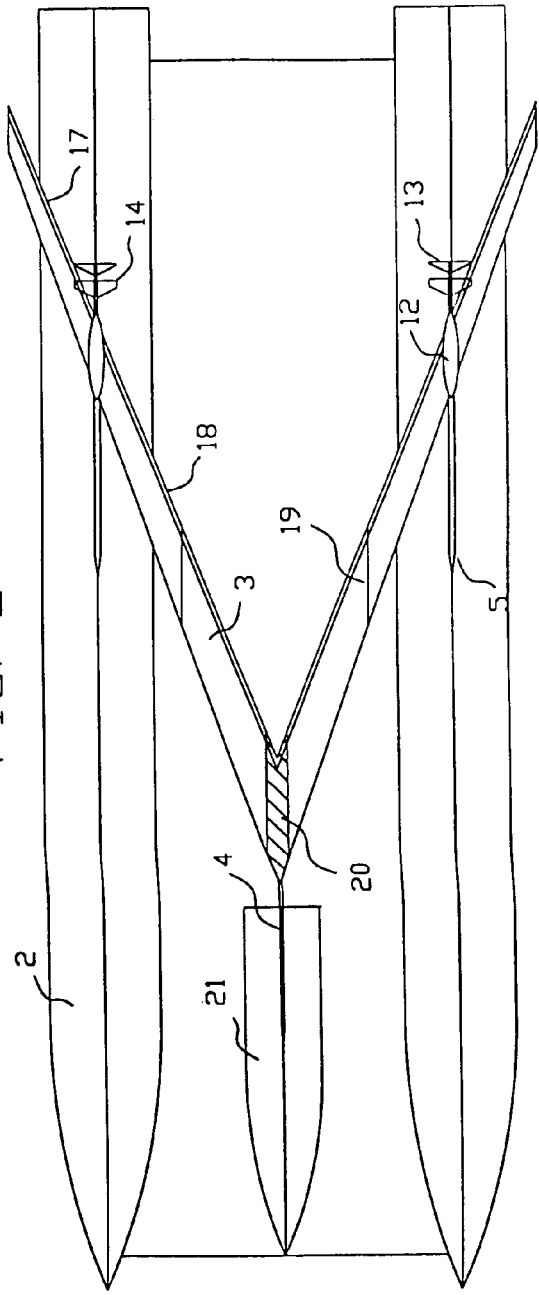
FIG. 2 shows a bottom view of the craft.

In FIGS. 1 and 2, the hull 2 of hydrofoil craft 1 is supported above water by forward strut 4 and two aft struts 5 which are attached to lifting v-hydrofoil 3. The propulsion system consists of engine 7 in each catamaran hull 6 that drives shaft 8 located in duct 9 of strut 5, thereby eliminating drag on the drive shaft. Shaft 8 enters gearbox 11 located inside pod 12 to drive propeller 13. Pre-spin vanes 14 rotate the water flow entering the propeller so that the water flow leaves the propeller without significant rotation, thereby increasing propeller efficiency. This hydrofoil and propulsion arrangement is equally applicable to monohulls, trimarans or other hull shapes, and applies to one or more support struts, engines and propulsors. Each strut can either be swept back, as shown, or unswept, or swept forward. Strut sweep reduces strut spray drag, and reduces strut side force in beam waves. Hydrofoil sweep reduces susceptibility to cavitation, and reduces craft vertical motion in waves. The sweep shown in FIG. 2 is around 70 degrees. Sweep of only 30 degrees is beneficial. Sweeps of 45 and 60 degrees are more beneficial. These beneficial effects are not affected whether a hydrofoil is swept back or forward. With a leading edge sweep angle of 70 degrees, the included angle between leading edges is 40 degrees. With a sweep angle of 30 degrees, the included angle is 120 degrees. Sweep angles are measured from a direction perpendicular to the craft centerline. Hydrofoil chord distribution affects induced drag. Minimum induced drag occurs for an elliptic chord distribution. Longer chords are nearer the craft center, shorter chords are nearer the hydrofoil tips.

A debris cutter is positioned at an intersection of the body and the hydrofoil. The at least one horizontal drive shaft includes at least one set of counter-rotating drive shafts connected to the propulsion drive shafts and at least one set of counter-rotating propellers attached to the at least one set of horizontal counter-rotating drive shafts. A set of anti-swirl vanes is attached in line with the at least one propeller on either side of each propeller.

Rudder 10 in each aft strut 5 helps to steer the craft. Banking the craft into a turn by using flaps increases turn rate, and minimizes craft side force. Hinges 15 and retractors, connected to the hydrofoil and to the hull, retract the hydrofoil and permit the hydrofoil to retract rearward and upward. Sonar device 16 helps to detect underwater obstacles that lie in the path of the craft, and can also serve to generate forward-projected sounds to frighten or urge sea animals away from the path of the craft.

An automatic control system 201 is connected to outboard flaps 17 and inboard flaps 18. Outboard trailing edge flaps 17 serve to control craft roll and pitch, and together with inboard flaps 18, serve to control craft height. Fences 19, wetted pods 12, and wetted region 20 serve as fences to separate adjacent spanwise cavities on the hydrofoil in the case where the hydrofoil is supplied with gas cavities to reduce drag. Plural jets 203 supply gas to each adjacent cavity. Bearings and gearing are provided for the drive shaft. Gas ducting along the drive shaft serves to cool the bearings and gearing. Projection 21 on the underside of hull 2 at the center helps to reduce forward strut height, and to cushion bow impacts when operating in large waves.

A sweptback v-hydrofoil that is placed at a small angle of attack can appear to have a small negative dihedral 22, or it can be designed for a negative dihedral; in either case, it will appear somewhat as shown in FIG. 3. Alternatively, for dynamic reasons in some cases, a v-hydrofoil might be designed with a positive dihedral 23, as shown in FIG. 4. The angle of attack reduces towards each tip.

Calculations show that shrouded air propellers 24, such as shown in FIG. 4, can be as efficient as underwater propellers in some cases.

FIG. 5 illustrates a hydrofoil 25 whose sweep is reversed from that of hydrofoil 3 in FIG. 2. From the viewpoint of foil sweep theory, little difference exists whether a foil is swept forward or back. The hydrofoil resembles a delta foil.

The drag of a hydrofoil, such as the one shown on the craft in FIGS. 1 and 2, can be greatly reduced by covering the majority of one or both surfaces with a closed gas cavity, as shown in FIG. 6. The wedge-like nosepiece 31 of hydrofoil 30 introduces a surface discontinuity 31A on an otherwise streamlined upper surface 34, and a surface discontinuity 31B on an otherwise streamlined lower surface 34 of the hydrofoil, that causes the water boundary layer to separate from each side of the nosepiece. By introducing gas into the wake region of separated flow lying behind the discontinuity, a gas cavity 32, 33 can be formed. The flow discontinuity can be a 90-degree downward angle or step in the surface, as shown, or it could be a smaller downward angle, to as little as around 10 degrees. The discontinuity can also be a protuberance from the surface, such as spanwise wedge with a blunt trailing edge, where a trailing edge step serves to separate the water boundary layer from the surface. Other kinds of discontinuities are shown in FIGS. 12–14.

Theory shows that cavity drag is zero, if the cavity closes smoothly. In the real world, it is not possible to exactly smoothly close a cavity. However, it is possible to minimize the contact angle between a cavity and an underlying surface in the cavity closure region so that forward splash at cavity closure is minimized, thereby minimizing the gas entrainment rate, and thus minimizing the size of the wake, and cavity drag.

FIG. 6 shows two cavities on each hydrofoil surface 34, 35, a shorter cavity 32S, 33S that closes in desired closure regions 36 and 37, and a longer cavity 32L, 33L that closes at 38 and 39 behind the desired closure region. Note that the hydrofoil surface 34, 35 is convexly curved so that the closure angle of shorter cavity in each case is much smaller than the closure angle of the larger cavity. Because of the greater closure angle, more gas is entrained out of the larger cavities than out of the shorter cavities. Consequently, if the gas flow rate into each cavity is controlled so as to not exceed the rate needed to close the shorter cavity, then neither cavity can close behind the desired closure region because not enough gas will be available to further extend the cavity. To determine where a cavity closes, cavity sensors 40 can be used to sense cavity length.

The shape of a gas cavity depends upon the cavity number $K=(P_o-P_c)/q$, where $P_o$ is static depth pressure, $P_c$ is cavity pressure, and q is the dynamic water pressure, where q is the speed squared times half the mass density of water. If K is small, the cavity is long and thin, and if K is large, the cavity is short and thick. In two-dimensional flow, $K=2T/C$ where T=cavity thickness and C=cavity length; the cavity shape is an ellipse. As used throughout this patent, the word "gas" means any kind of gas, including air.

Figure 7:
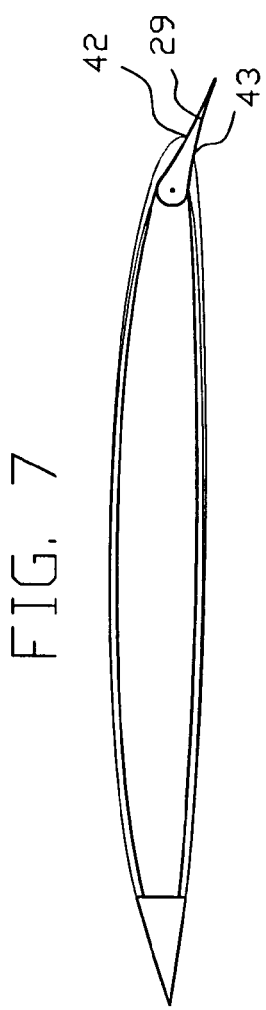
FIG. 7 shows the same hydrofoil with the flap deflected.

A tail flap 29 is shown in FIG. 6 in its neutral position, and is shown deflected in FIG. 7. Note that the location of the closure points, 42 and 43, for the longer cavity on each surface has not appreciably changed, indicating that the flap can be deflected without risk of the longer cavities lengthening beyond the trailing edge, especially if the flap is long enough. If necessary, a flap chord can be increased when the flap is deflected. Placing a concave surface just ahead of the trailing edge on each side of the flap 29 will increase the cavity closure angle in the region ahead of the trailing edge to help to ensure that the longer cavities will not close behind the trailing edge.

Figure 8:
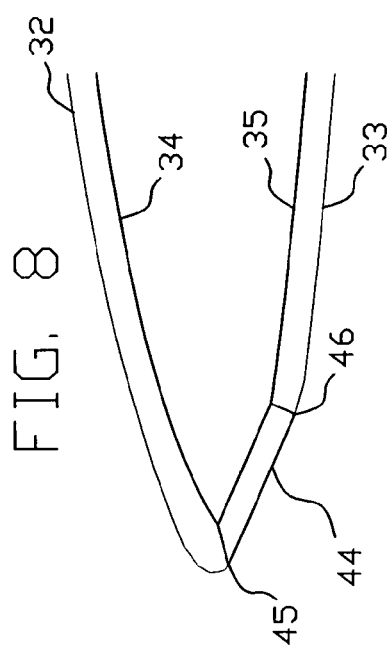
FIG. 8 is a schematic detail of an alternative hydrofoil nose section comprising an angled plate.
Figure 9:
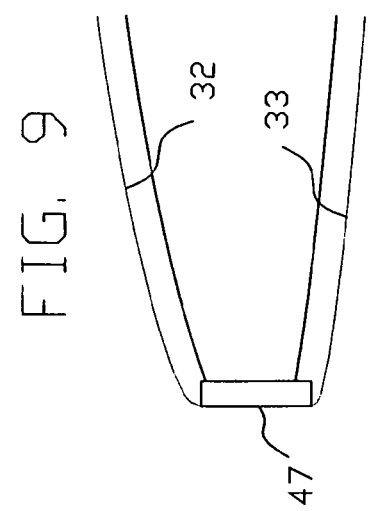
FIG. 9 is a schematic detail of another alternative hydrofoil nose section comprising a perpendicular plate.

A variety of nosepiece shapes can be used to initiate the cavities, such as angled nosepiece 44 placed on the lower front side of the hydrofoil in FIG. 8 to start cavities at discontinuities 45 and 46, or nosepiece 47 placed perpendicular to the flow in FIG. 9. Such nosepieces can be placed at any angle greater than about five degrees to the oncoming water flow. The nosepiece can be curved either way, and can include changes in angle. Nosepiece 47 can instead be v-shaped, or cup-shaped, wherein the upper and lower edges lie ahead of the center section.

Figure 10:
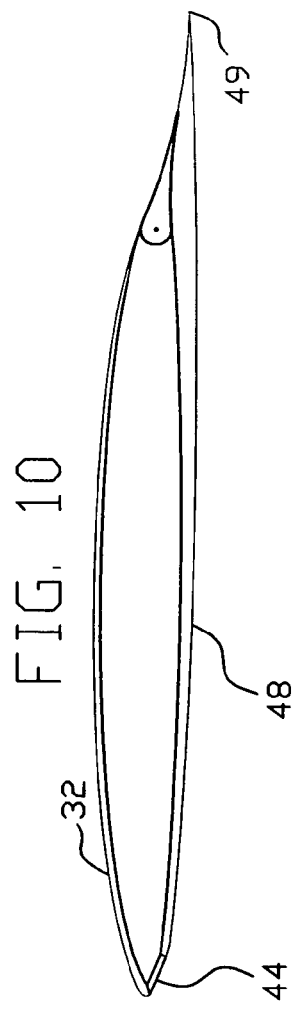
FIG. 10 is a schematic representation of a different kind of low drag hydrofoil that has a closed cavity on the upper surface, and a superventilated cavity on the lower surface.

The special hydrofoil shape in FIG. 10 shows promise for even-greater frictional drag reduction because its only wetted surface areas are the lower surface of the nosepiece 44 and the upper surface of the trailing edge flap. Here, the upper surface is covered with closed cavity 32, and the lower surface is covered with an open, superventilated cavity 48 that closes behind the trailing edge at 49. This hydrofoil design should have very low frictional drag if the cavity merger angle at 49 is made small. Trailing edge regions have removable sections.

The shape of a wetted hydrofoil nosepiece can be varied to change upper and lower cavity shapes, assist in controlling lift, and to reduce drag. For example, the angles of the upper and lower surfaces of wedge-shaped, flexible plate 58 can be independently controlled, controlling geometry of a hydrofoil cross-section, as shown in FIG. 11, by changing the length of actuator 60 which is attached between rigid hydrofoil center plate 55 and rigid nose plate 59 to deflect the flexible v-plates 56 and 58 either outward or inward. The lower part 57 of the nosepiece can be controlled similarly. An automatic control system 201 is provided for controlling the at least one nose flap for changing local hydrofoil lift. Changing the foil geometry can change the size of the cavity. Changing the size of a cavity can change foil lift, which in turn changes vessel height.

Another way to change nosepiece shape is shown in FIG. 12 where plate 61 is moved vertically relative to nosepiece 31 in order to deflect cavity 32.

Still another way to change nosepiece shape is shown in FIG. 13 where plate 44 is rotated about axis 62 to deflect upper and lower cavities 32 and 33.

Because cavity number K increases as speed reduces, cavities tend to be shorter and thicker at lower speeds. Therefore, to reduce frictional drag at lower speeds, it is necessary to change cavity shape by either changing hydrofoil geometry, hydrofoil angle of attack, gas flow rates, cavity pressures, or combinations thereof. Various ways of changing hydrofoil geometry and hydrofoil pitch or angle of attack have been discussed. Typically, for a given hydrofoil geometry, a change in gas flow rate will provide an accompanying change in cavity pressure and shape. Thus, the gas source pressures and flow rates must be adequate to supply gas to the cavities under all of the desired operating conditions. Control of gas flow into the cavity is accomplished with a pressure of the gas source and the size of the openings. A take off mode controller 205 is provided for supplying additional gas to the cavity on the lower surface for permitting the cavity to extend beyond the trailing edge for increasing hydrofoil lift.

In most hydrofoil designs, the cavity pressure on the upper surface is less than atmospheric pressure, in which case the upper cavity gas can be air that is drawn from the atmosphere without using an air pump. If the upper cavity pressure is low enough, then a turbine can be placed in the associated air duct to generate power. A generator 207 is connected to the craft, and air supplied to the cavity on the upper surface at a pressure lower than atmospheric pressure is used to generate power in the generator. Typically, the pressure on the lower surface of a hydrofoil is greater than atmospheric, in which case the gas, such as air, must be pressurized using a pump. However, in some cases, hydrofoil speed and geometry is such that the pressure on the lower surface of a hydrofoil, although greater than the pressure on the upper surface, can be made less than atmospheric pressure, in which case, no pump is needed and atmospheric air can be used.

For all lifting hydrofoils, the lower cavity must be at a higher pressure than the upper cavity. Consequently, there may be design cases where the simplest and best solution is to supply gas only to the lower cavity, and then duct some of the gas into the upper cavity. One such way is shown in FIG. 14 where gas from a lower cavity is passed through duct 63 to an upper cavity using orifices 64 and/or 65 to meter, or restrict, the gas flow rate. These orifices, restrictors, or limiters could be valves, or ducts 63 could be made small enough to act as a restrictor, or limiter, to meter the gas flow rate without using valves or orifices. A gas flow restrictor 209 communicates with each gas flow releaser for ensuring that each cavity closes ahead of the trailing edge.

It may be desirable to keep water out of the hydrofoil gas ducts. FIG. 15 shows flaps 68 that are used to cover gas ejection holes, or gas releasers, from hydrofoil ducts 69 and 70 through upper hydrofoil plate 66, and lower hydrofoil plate 67, wherein the flaps close the holes when no gas is ejected, but spring open when gas is released. Alternatively, one-way valves can be used instead of flaps.

In some cases, it is desirable to replace nosepieces, including the case where a nosepiece is damaged. The various kinds of nosepieces shown in FIGS. 11–14 can be attached by various well-known methods to permit them to be removable. Leading edge regions have sections 211 that are replaceable.

FIG. 16 shows how gas enters hydrofoil ducts 69 and 70 from strut ducts 71 and 73, which act as gas sources, at a strut/hydrofoil juncture. Ducts 71 and 73 are more typically placed one ahead of the other in the plane of the strut rather than as side-by-side, as shown for clarity in the figure.

The hydrofoil cross section in FIG. 17 again shows strut ducts 71 and 73 to bring gas into hydrofoil duct 69 for ejection into upper surface cavities, and into duct 70 for ejection into lower surface cavities. In this case, valves or holes 78 and 79 meter some of the gas into adjacent spanwise ducts for distribution to other cavities located at other spanwise stations along the hydrofoil span. The gas passes through restrictor permeable walls 72 and 74 at the forward ends of the hydrofoil ducts, through slots at the front end of the upper and lower hydrofoil plates, and into the upper and lower cavities. The upper and lower surfaces of the hydrofoil are said to be substantially, or essentially, continuous in spite of the small slot aft of the nosepiece through which gas is ejected. To provide greater strength, if needed, the hydrofoil can be made solid in the mid and aft section, as shown in FIG. 17. If it is desired to remove gas from a hydrofoil cavity on one or both sides, and recycle it, then a suction inlet and gas pump, such as 75, 76, can be installed where the gas is returned by line 77 to gas duct 69 for recycling. At least one gas remover 75 is mounted near the trailing edge for removing gas from near an aft end of at least one of the cavities. A water separator 213 is connected to the at least one gas remover for separating water from the removed gas, and for recycling the removed gas.

Another way to distribute gas to different cavities located on the upper and lower surfaces of a hydrofoil is shown in FIG. 18. Gas for the upper surface cavities enters from strut duct 71 into hydrofoil duct 80 where it passes through valves 82 into separated forward spanwise ducts 69, and from there through restrictor holes in wall 72 into separated spanwise cavities located along the upper surface of the hydrofoil. Gas for the lower surface cavities enters from strut duct 73 into hydrofoil duct 83 where it passes through valves 85 into separated rearward and forward spanwise ducts 86, 70, and through holes in walls 87 and 74 into separated spanwise cavities located along the lower surface of the hydrofoil.

Still another way to distribute gas into cavities is shown in FIG. 19. Gas for one upper surface cavity enters from duct 71 into an upper hydrofoil duct where it passes forward through holes in wall 72 into the cavity, while gas for a second upper surface cavity enters from duct 90 into a different upper hydrofoil duct where it passes forward through different holes in walls 92 and 72, while gas for a third upper surface cavity enters from duct 94 into a still different upper hydrofoil duct where it passes forward through still different holes in walls 96, 92 and 72. Each of the three hydrofoil ducts is sealed spanwise to prevent gas from being ejected into more than one cavity. Similarly, gas for the lower surface cavities enters the hydrofoil through ducts 73, 91 and 95, and passes through different holes in walls 74, 93 and 97. As seen from FIGS. 14, 15, and 17–19, many different ways, and combinations of ways, exist for gas to be moved from strut ducts into hydrofoil cavities.

Figure 20:
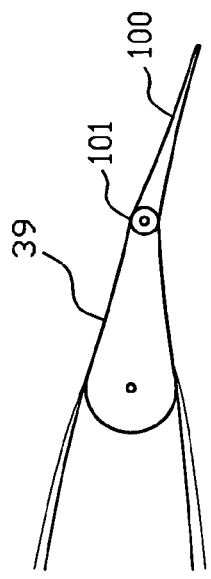
FIG. 20 is a schematic detail of a tail region of a hydrofoil showing a tab in a tail flap.

To reduce the torque needed to deflect a tail flap, such as flap 39 in FIG. 20, a section of the flap, such as tab 100, can be pivoted about axis 101.

Figure 21A:
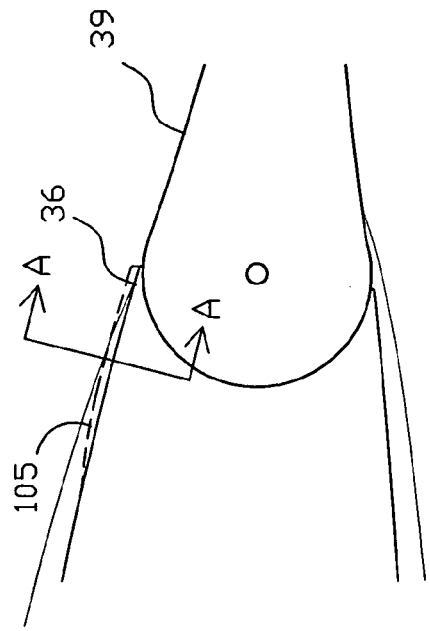
FIGS. 21A and B illustrate parallel ridges on a hydrofoil surface aligned with the water flow that are located in the desired cavity closure region.
Figure 21B:
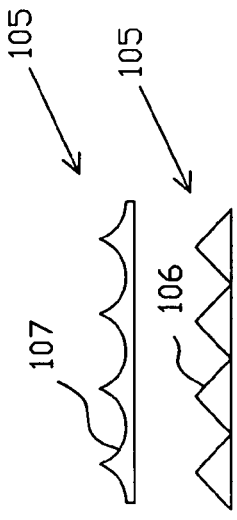

As mentioned earlier, some cavity drag will occur at cavity closure due to forward splash and air entrainment. To minimize cavity drag, small parallel ridges 105, as shown in side view in FIG. 21A, and as shown in cross sections A—A in FIG. 21B, can be placed in line with the water flow in the region of cavity closure to reduce splash and air entrainment. The ridges serve to direct the splash sideward and rearward, instead of directly forward, thus reducing disturbances at cavity closure, and thereby reducing air entrainment and drag. The ridges can be saw-shaped as in 106, or u-shaped as in 107, but should be aligned to within 30 degrees with the local water flow direction. Other ridge shape cross sections can be used, and the height of the ridges can taper down at each end.

Figure 22:
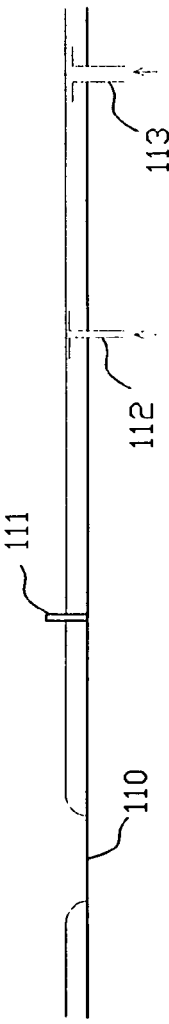
FIG. 22 is a spanwise cross section of a hydrofoil surface showing four kinds of fences that can be used to separate adjacent gas cavities.

Whenever gas cavities are formed on hydrofoils, struts or other surfaces, the pressures in adjacent cavities can be different, in which case the cavities should be separated by some type of a fence. FIG. 22 shows four types of fences, looking in the direction of water flow. Fence 110 is a wetted region on the underwater surface, and if sufficiently wide, serves to separate adjacent cavities having different pressures. A more common type of fence is thin plate 111 whose height must exceed the cavity height, and whose length must exceed the cavity length. Still another type of fence is water jet 112 comprising a sheet of water directed outward from the surface that has sufficient momentum to reach the cavity walls before being curved away from the cavity walls due to the pressure difference between cavities. Another type of fence is gas jet 113, which is similar to the water jet fence in that it also requires sufficient momentum to reach the cavity walls before being curved away from the cavity walls.

Figure 23B:
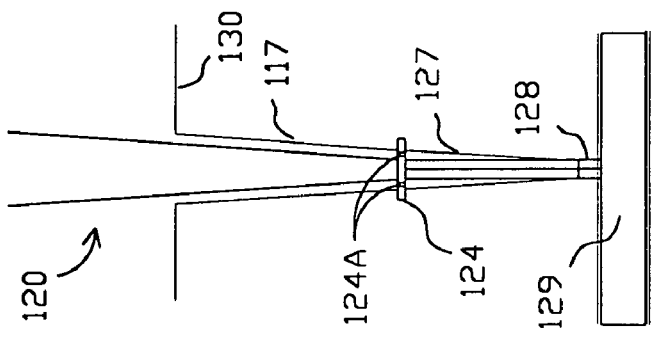
FIGS. 23A and B are side and end views of a swept, tapered strut that supports a hydrofoil, showing an upper superventilated region, a fence, a lower strut region with a closed cavity, and a bottom region that is fully wetted.
Figure 23A:
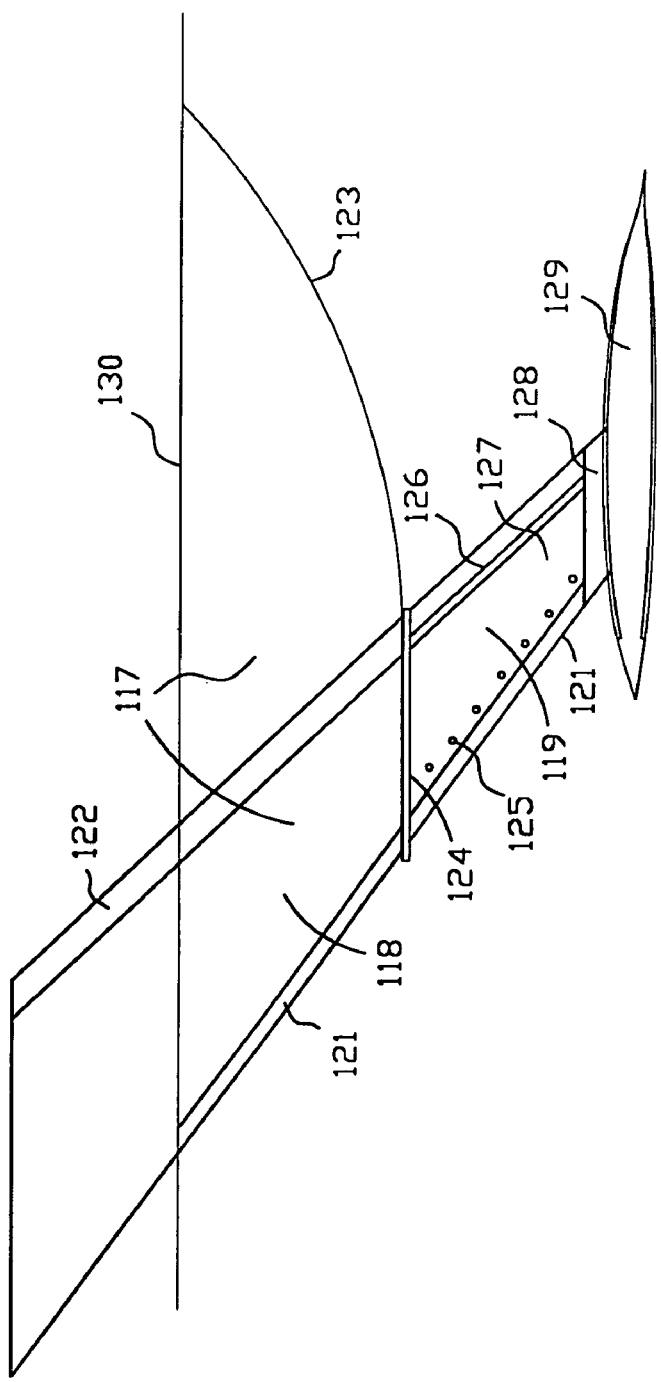

Strut 120, shown in FIGS. 23A and B, is superventilated 117 in an upper region 118 of the strut on both sides down to fence 124, starting at the ends of nosepiece 121 and ending along cavity closure line 123. Closure of an open cavity typically causes a plume of water to be raised above water surface 130, resulting in a bubbly wake whose loss in energy represents cavity drag. If strut 120 is sufficiently thin, then cavity drag can be much less than the frictional drag of a wetted strut. Below a certain depth, strut drag can be minimized in a lower region 119 by forming cavity 127 that closes along line 126. Typically, the pressure in cavity 127 is less than atmospheric, so fence 124 is needed to separate this cavity 127 from the upper cavity 123. Air for the closed cavity 127 can be introduced through holes 125 from a duct inside the strut, through spanwise slots lying behind nosepiece 121, or through holes 124A in fence 124 shown in FIG. 23B. In some cases, the closed cavity pressure can be made atmospheric, so fence 124 is not needed. To separate cavity 127 from a cavity on the upper surface of hydrofoil 129, a bottom region 128 of the strut is shown fully wetted to act as a fence between these cavities.

Figure 24:
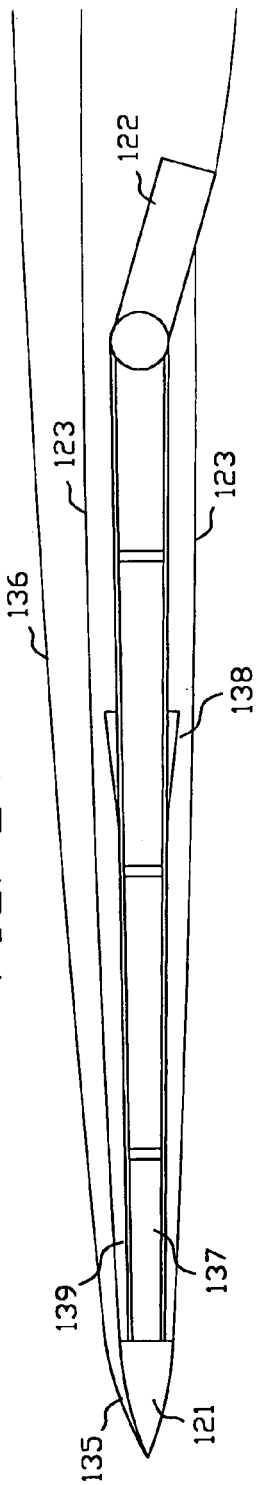
FIG. 24 is a cross section of the strut showing an optional nose flap used to deflect a cavity, a trailing edge flap, different internal ducts, and optional side wedges.
Figure 26:
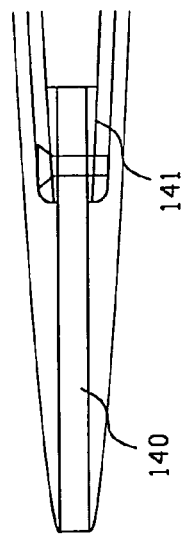
FIG. 26 illustrates an alternative flat plate nose to initiate cavities.
Figure 25:
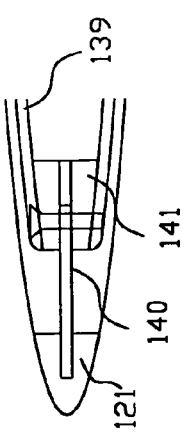
FIG. 25 is a schematic detail of a nose section of a strut showing how cavities are initiated, and how a nosepiece can be attached to the strut body.
Figure 27:
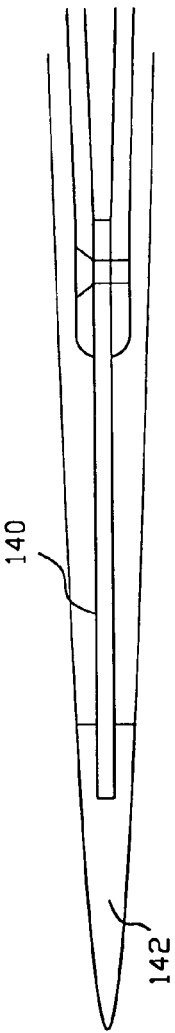
FIG. 27 illustrates an elongated version of the nosepiece shown in FIG. 25.

FIG. 24 is a cross section of the upper region of the strut shown in FIGS. 23A and B. Tail flap 122 is used to control strut side force for turning. The tail flap can either be deflected in the normal steady-state manner out a desired flap angle, or it can be deflected out to a fixed angle and back at a moderate frequency, sometimes called a "bang-bang" control. At least one adjustable trailing edge flap 122 is a trailing edge region of the body that extends ahead of the trailing edge over at least a portion of the trailing edge. The flap is deflected for controlling side force. Optional nose flap 135 can be deflected outward to move cavity 136 outward, if needed, to keep the cavity from wetting the strut under certain operating conditions. Alternatively, outward steps 138 can be placed on the strut sides to deflect cavity 123 away from the strut at lower speeds, or in waves, if needed. At least one additional discontinuity 138 on each side in the upper region is positioned aft of the discontinuity near the leading edge. A nose flap 135 is positioned on each side of the body. Each nose flap has a trailing edge that provides a discontinuity on that side. Each nose flap extends along at least a portion of a span of the body and each nose flap individually pivots outward from the body about an axis that lies close to the leading edge.

Various nose sections 121, 140 and 142, and ways of attaching the nose sections to struts, are shown in FIGS. 24–27. Center plate 140 can either be used to support a nosepiece, as in FIGS. 25 and 27, or it can be the nosepiece itself, as in FIG. 26. The upper region of the strut can be ventilated directly from the atmosphere, or additional air can be ejected through the strut to help ventilate the cavity, such as by ejecting air through a permeable member 141.

A ventilated strut can also be swept forward, such as strut 145 in FIG. 28, or angled to the vertical, such as strut 146 in FIG. 29. Also, a lower portion 148 of strut 120 can be spring loaded by means of spring 147 shown in FIG. 30 to permit attached hydrofoil 129 to move vertically relative to the craft in order to reduce craft motion in waves. If the hydrofoil does not provide the necessary damping, a damping device can be added in parallel with the spring means. Alternatively, the entire strut and hydrofoil system can be spring loaded to reduce motion in waves.

The drag of underwater propeller blades or rotors can be reduced by using gas cavities, such as by superventilating 151S the upper, or forward, surface 151A of blade 151, attached to hub 150, as shown in FIG. 31. A very efficient, new way to reduce drag on a propeller or rotor blade is to superventilate 152S the lower, or rearward, surface 152B of a blade 152, and form a closed cavity 152C on the upper, or forward, surface 152A, as shown by blade 152 in FIG. 32. Another very efficient way to reduce propeller frictional drag is to form closed cavities 153C, 153D on each side 153A, 153B of each blade, such as blade 153 shown in FIG. 33.

Instead of driving a propulsor with shafting, an electric motor 155 can be housed in pod 154 shown in FIG. 34 that drives a propulsor such as shrouded propeller 156, where shroud 157 is supported by vanes 158. By cambering the shroud outward, such as in a pumpjet, the water pressure inside the shroud can be increased above depth pressure, thus reducing cavitation on the rotor blades.

A problem associated with craft having fully submerged hydrofoils, such as the hydrofoil craft design shown in FIG. 1, is that an automatic control system is needed to dynamically stabilize the craft. A bow lifter, such as a surface piercing, inverted, sweptback v-hydrofoil 163, as shown in FIGS. 35 and 36, can be attached to hull 160 of hydrofoil boat 162 to stabilize the boat in heave, pitch and roll. For example, if boat 162 were lowered in the water, then the lift of bow hydrofoil 163 would increase, the bow would rise, and hydrofoil 3 would also rise due to the increased angle of attack. Similarly, if the boat pitch suddenly increased, then hydrofoil 3 would rise to bring pitch back to normal. Although boat 162 is shown with an outboard drive 161, the same type of bow hydrofoil 163 may be used with a larger boat or ship. In case of a sudden roll, FIG. 36 shows that one side of bow hydrofoil 163 would lower, and the other side would rise, causing a hydrodynamic moment that restores the boat angle back to level. A different type of bow lifter is a series of flexible parallel planing plates 164, shown in FIG. 37 to stabilize a craft in heave and pitch, and also roll if the span is large enough. Many other kinds of bow lifters can be used, including ski-like lifters that look much like the lifter shown in FIG. 37; two side-by-side skis can provide roll stability. The bow lifter could also be shaped like a cut-off bow of a boat placed below the hull bow, such as shown in FIG. 2; two such cut-off bows can provide roll stability.

Another way to stabilize a hydrofoil boat in roll is to angle the ends of hydrofoil 3 upward to pierce the water surface, as shown in FIG. 38 by a hydrofoil with midsection 165, and lifting end sections 167. In this case, fences 166 are needed to separate adjacent cavities, especially if hydrofoil section 167 is outfitted with different kinds of cavities above fence 166. Since the boat is now stabilized in roll, bow hydrofoil 163 could be replaced by bow hydrofoil 168 shown in FIG. 39, which is a surface piercing v-hydrofoil with positive dihedral. Hydrofoil 168 would provide the needed heave and pitch stability. In one embodiment, the hydrofoil is a main hydrofoil and an additional hydrofoil is mounted above the main hydrofoil for providing additional lift for takeoff and for improving operation in waves.

Also shown in FIG. 39, are tip hydrofoils 169 for reducing the induced drag of the hydrofoil. These tip hydrofoils serve to increase the aspect ratio of the main hydrofoil by increasing its span and changing the flow pattern near each end. The tip hydrofoils can be angled up or down relative to the main hydrofoil, and can be either fully wetted or have a closed cavity on one or both surfaces. At least one surface of at least one tip hydrofoil has a closed cavity for reducing drag. The tip hydrofoils can also be placed at an angle of attack to the flow in order to generate a vortex that is opposite in direction to the usual tip vortex generated near each end of a main hydrofoil to reduce induced drag.

Another way to stabilize a hydrofoil boat is to retain hydrofoil 3, but support it with aft angled struts 5A designed to provide lift and stabilize the boat in roll. Struts 5A would then become surface piercing hydrofoils.

Figure 40:
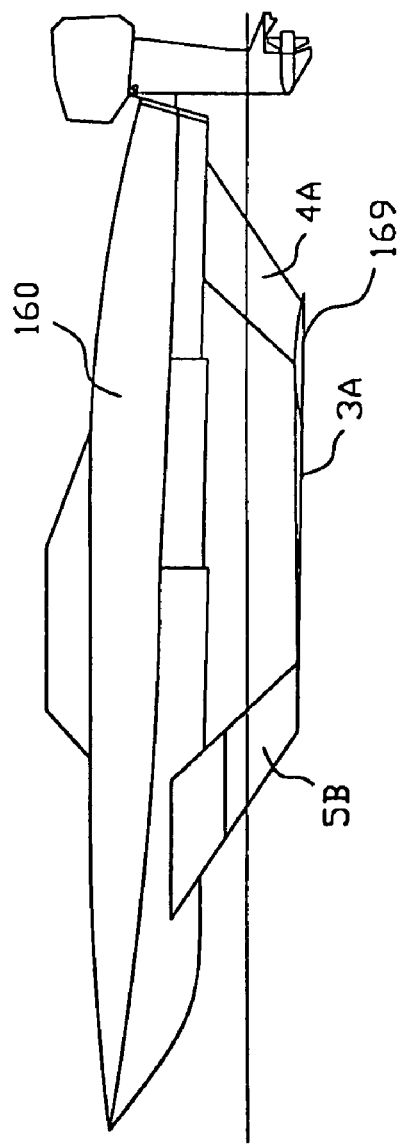
FIG. 40 is a side view of the hydrofoil boat wherein the main v-hydrofoil is reversed in sweep wherein the tips of the hydrofoil are forward, and are canted upward to provide pitch and roll stability.

Still another version of a hydrofoil boat is to reverse hydrofoil 3A so it is swept forward, and angle ends 5B of hydrofoil 3A upward, as shown in FIG. 40 to stabilize the boat in heave, pitch and roll. Aft, single strut 4A now supports the vee tip 169 of hydrofoil 3A. Strut 4A could instead be swept down and back.

There are a wide variety of ways to stabilize a hydrofoil boat in heave, pitch and roll, including the addition of bow lifting means, and angling sections of hydrofoil 3 and angling struts, any of which can be wetted, or vented with cavities to reduce drag.

Figure 41:
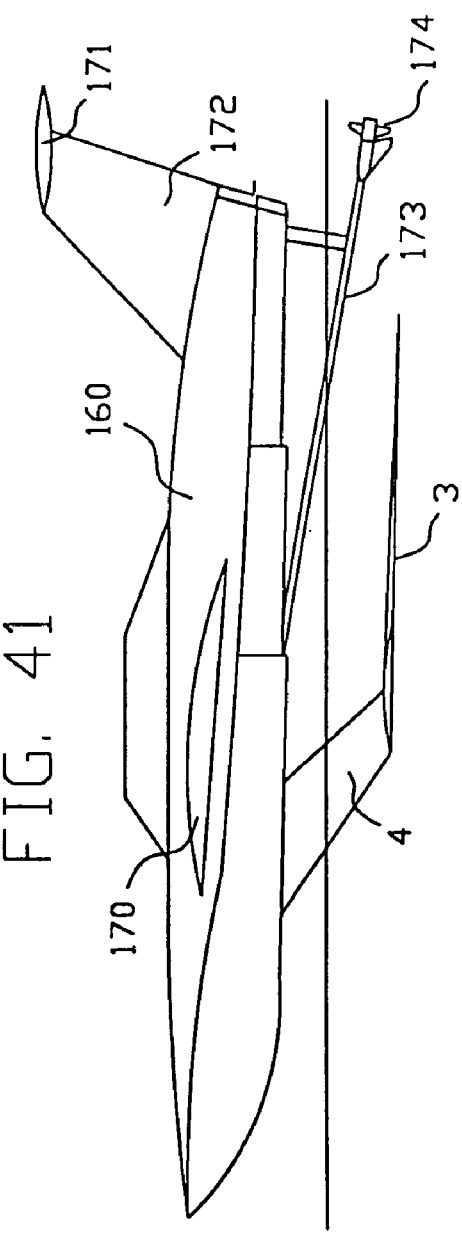
FIG. 41 is a side view of a hydrofoil boat hull supported above water by a strut attached to a lifting, swept v-hydrofoil, wherein part of the boat lift is provided by aerodynamic wing lift, and wherein the boat is stabilized in pitch and yaw by an aerodynamic tail.

To improve performance on high speed hydrofoil boats or ships, aerodynamic lift can be used to supplement hydrodynamic lift. For example, wing 170 in FIG. 41 can be added to augment the lift of hydrofoil 3 to support hull 160 above water. Propeller 174 is shown attached to canted shaft 173 to drive the boat. Alternatively, outboard motors can be used, or an air propulsion system. Vertical air stabilizer 172, and horizontal air stabilizer 171 can provide aerodynamic stability in pitch and yaw. Wing 170, due to its closeness to the water surface, and the resulting ground effect, can provide heave and pitch stability. Alternatively, aerodynamic control surfaces can be used to control heave, pitch and roll. Also, hull 160 can be shaped to augment lift, instead of wing 170, especially if the hull is a catamaran or a trimaran where the cross structure can be shaped to generate lift.

In the various hydrofoil craft designs shown herein, the hull does not have to be supported entirely above water; instead, the hull could remain in contact with the water, in which case hull lift would be augmented by hydrofoil lift.

Air cavities can be used in a wide variety of ways to reduce drag on underwater surfaces. FIGS. 42 and 43 illustrate a way to use closed air cavities to reduce drag on the sides and bottom of surface ship 180. A discontinuity or step 182 at the end on each side of nosepiece 181 forms a side cavity 183. A series of multiple steps 184 are placed downstream to form additional closed cavities 185 that terminate by wetted tailpiece 186. Frictional drag on the bottom surface 190 is minimized similarly, starting with nose step 187 and closed cavity 187C, followed by multiple steps 187 and cavities 187C, until reaching wetted tailpiece 186. The surface 192 underlying each cavity is curved somewhat like the cavity surface 194, and is designed to minimize the contact angle 196 at the end of each cavity. A fence is needed between each side cavity and each adjacent bottom cavity. The cavity lengths on the bottom are not necessarily the same as the lengths of the side cavities. Also, the height and angle of the various surfaces ahead of each step tend to vary with depth, and with downstream station. Typically, cavities are longer and thinner near the surface than near the bottom. At the very surface, the side cavity shapes tend to be parabolic, so here the cavities tend not to close; however, as depth increases, the side cavities will close. Because of this depth effect, steps 187 tend to increase in height toward the bottom. Since cavity shapes change with speed, step heights can either vary in height with speed, or step heights can be designed for a specific speed, and more steps added for use at lower speeds.

The hull shown in FIG. 44 is similar to that in FIG. 42, except it is essentially under underwater, so it has an upper surface 198 that is also covered with closed cavities 189, formed by a series of steps 188 to generate a series of cavities 189 to reduce drag. Nose and tail sections, 181 and 186, pierce the surface to provide air for the cavities, and provide heave and pitch stability; roll stability is achieved by placing the center of gravity below the center of buoyancy.

In the many embodiments described herein, each can be used with others, or parts of each can be combined with parts of others, to enhance efficiency or performance. Also, automatic control systems, in conjunction with a variety of sensors, can be used to control any moving part in order to dynamically control craft motion, or to control cavity effectiveness.

While the invention has been described with reference to specific embodiments, modifications and variations of the invention may be constructed without departing from the scope of the invention, which is defined in the following claims.

We claim:

1. A hydrofoil craft comprising at least one hull that lies at least mostly above water, a propulsion system, and at least one strut whose upper end is attached to the at least one hull and whose lower end is attached to a fully-submerged dynamically-lifting hydrofoil, the hydrofoil further comprising a leading edge and a trailing edge, a substantially continuous upper surface and a substantially continuous lower surface, a spanwise discontinuity in each surface near the leading edge for causing a local water boundary layer to separate from each surface, at least one gas source, a gas releaser behind the discontinuity on each surface for forming a cavity that extends rearward along each surface from the discontinuity to a cavity closure region near the trailing edge, a gas flow restrictor connected to each gas releaser for limiting gas released into each cavity and ensuring that each cavity closes ahead of the trailing edge, wherein pressure in the cavity on the upper surface is less than pressure in the cavity on the lower surface, wherein most of the upper and lower surfaces of the hydrofoil lie within the cavities, and wherein each surface in the cavity closure region is shaped for closing the cavity on that side relatively smoothly by minimizing a cavity contact angle between the cavity wall and the surface.

2. The hydrofoil craft of claim 1, wherein gas released into the cavity on the lower surface is pressurized below atmospheric pressure.

3. The hydrofoil craft of claim 1, further comprising at least one trailing edge flap positioned along at least a portion of the trailing edge.

4. The hydrofoil craft of claim 3, wherein a chord of the trailing edge flap is lengthened when the flap is lowered.

5. The hydrofoil craft of claim 3, further comprising outer trailing edge flaps that extend inward from vicinities of outer tips on lateral ends of the hydrofoil, and approximately fore-and-aft fences positioned on the upper and lower surfaces at inner ends of the outer trailing edge flaps for isolating adjacent spanwise gas cavities.

6. The hydrofoil craft of claim 5, further comprising an automatic motion control system connected to the outer trailing edge flaps for controlling vessel roll and pitch.

7. The hydrofoil craft of claim 5, further comprising inner trailing edge flaps positioned inboard of the outer trailing edge flaps.

8. The hydrofoil craft of claim 7, further comprising a gas duct inside the hydrofoil for supplying gas into the cavities.

9. The hydrofoil craft of claim 7, including upper and lower central fences located near centers of the upper and lower surfaces for isolating cavities on each side of the center, further comprising additional gas ducts inside the hydrofoil for releasing gas into additional isolated cavities.

10. The hydrofoil craft of claim 7, further comprising an automatic motion control system connected to the inner and outer trailing edge flaps for controlling vessel height above water.

11. The hydrofoil craft of claim 1, wherein the gas flow restrictor for at least one of the surfaces of the hydrofoil comprises a permeable wall through which gas must pass before being released into the cavity on at least one surface.

12. The hydrofoil craft of claim 11, wherein the permeable wall is a solid wall with holes that limit a gas flow rate.

13. The hydrofoil craft of claim 1, wherein the gas flow restrictor for at least one of the cavities on the hydrofoil comprises at least one valve through which the gas must pass before being released into the at least one cavity.

14. The hydrofoil craft of claim 13, further comprising an automatic control system connected to at least one valve.

15. The hydrofoil craft of claim 14, further comprising at least one sensor mounted on the craft for sensing cavity length or vessel speed, and connected to an input of the automatic control system.

16. The hydrofoil craft of claim 1, further comprising at least one fore-and-aft fence positioned along the surfaces for separating at least one of the cavities into multiple adjacent cavities, positioned on one or both surfaces of the hydrofoil.

17. The hydrofoil craft of claim 16, wherein the at least one fence comprises a thin plate.

18. The hydrofoil craft of claim 16, wherein the at least one fence comprises a strip of fully wetted flow.

19. The hydrofoil craft of claim 16, wherein the at least one fence comprises a fluid jet, with water or air, released from at least one of the surfaces.

20. The hydrofoil craft of claim 16, wherein the at least one fence extends a length of the cavity, and is either shorter or longer than a hydrofoil chord.

21. The hydrofoil craft of claim 20, wherein the gas releasers comprise plural gas jets for supplying gas to each adjacent cavity.

22. The hydrofoil craft of claim 20, further comprising a nose region of the hydrofoil extending aft from the leading edge to each discontinuity and a deflector for deflecting the nose region for changing hydrofoil geometry for control purposes.

23. The hydrofoil craft of claim 1, wherein a size of at least one of the cavities is changed by controlling geometry of a hydrofoil cross section.

24. The hydrofoil craft of claim 1, wherein a cavity contact angle significantly increases when one of the cavities closes beyond a desired cavity closure region.

25. The hydrofoil craft of claim 1, further comprising a wedge-like leading edge region having upper and lower aft ends, and wherein the upper and lower aft ends of the leading edge region comprise the upper and lower surface discontinuities.

26. The hydrofoil craft of claim 25, wherein surfaces of the leading edge region are curved.

27. The hydrofoil craft of claim 1, wherein the at least one gas source comprises air at atmospheric pressure, and pressure in the cavity on the lower surface is less than atmospheric pressure at a designed craft speed.

28. The hydrofoil craft of claim 1, further comprising at least one gas remover mounted near the trailing edge for removing gas from near an aft end of at least one of the cavities, a water separator connected to the at least one gas remover for separating water from the removed gas, and a recycler for recycling the removed gas.

29. The hydrofoil craft of claim 1, wherein the upper and lower surfaces in regions just ahead of the trailing edge are concave.

30. The hydrofoil craft of claim 1, wherein the hydrofoil is swept at least about 45 degrees forward or aft from a center.

31. The hydrofoil craft of claim 1, wherein the hydrofoil is swept at least about 70 degrees forward or aft from a center.

32. The hydrofoil craft of claim 1, further comprising at least one nose flap on each surface of the hydrofoil extending from a vicinity of the leading edge rearward to the discontinuity on each surface, wherein the at least one nose flap pivots outward from an axis lying close to the leading edge for controlling cavity thickness on each surface.

33. The hydrofoil craft of claim 32, further comprising an automatic control system for controlling the at least one nose flap for changing local hydrofoil lift.

34. The hydrofoil craft of claim 32, wherein each nose flap further comprises a flexible region near the leading edge for acting as a pivot, and wherein each nose flap further comprises an essentially rigid portion having a nose flap trailing edge which comprises the discontinuity.

35. The hydrofoil craft of claim 1, wherein the leading edge of the hydrofoil is swept either forward or back.

36. The hydrofoil craft of claim 1, further comprising a section of a trailing edge region that is replaceable.

37. The hydrofoil craft of claim 1, further comprising a one way valve at each gas releaser for preventing water from entering a gas supply system.

38. The hydrofoil craft of claim 1, further comprising retractors connected to the hydrofoil and the hull for retracting the hydrofoil.

39. The hydrofoil craft of claim 1, further comprising a take off mode controller for supplying additional gas to the cavity on the lower surface for permitting the cavity to extend beyond the trailing edge for increasing hydrofoil lift.

40. The hydrofoil craft of claim 1, further comprising one or more flaps connected to the hydrofoil for lowering and increasing hydrofoil lift for take off.

41. The hydrofoil craft of claim 1, further comprising at least one additional hydrodynamic lifting device mounted on the craft above the hydrofoil for increasing lift at take off.

42. The hydrofoil craft of claim 1, wherein a planform of the hydrofoil is tapered toward a tip on each end.

43. The hydrofoil craft of claim 42, wherein the taper approximates an ellipse.

44. The hydrofoil craft of claim 42, wherein local angle of attack of the hydrofoil reduces toward each tip.

45. The hydrofoil craft of claim 42, wherein the hydrofoil is swept either forward or back.

46. The hydrofoil craft of claim 45, wherein the hydrofoil resembles a delta foil.

47. The hydrofoil craft of claim 1, wherein a leading edge region that includes the leading edge varies in cross section along a span of the hydrofoil.

48. The hydrofoil craft of claim 47, wherein a trailing edge region that includes the trailing edge of the hydrofoil varies in cross section along the span.

49. The hydrofoil craft of claim 1, further comprising a generator connected to the craft and wherein air supplied to the cavity on the upper surface at a pressure lower than atmospheric pressure is used to generate power in the generator.

50. The hydrofoil craft of claim 1, wherein the hydrofoil has an up or down dihedral angle.

51. The hydrofoil craft of claim 1, wherein the hydrofoil comprises a main hydrofoil, and further comprising an additional hydrofoil mounted above the main hydrofoil for providing additional lift for take off and for improving operation in waves.

52. The hydrofoil craft of claim 1, further comprising a series of parallel ridges placed in the cavity closure region near a desired cavity closure location, wherein the ridges are angled to within 30 degrees of a water flow direction, and wherein cross sections of the ridges comprise a series of essentially symmetrical saw-tooth-like shapes.

53. The hydrofoil craft of claim 52, wherein the ridges are an outer surface of a film that is attached to the hydrofoil in the cavity closure region.

54. The hydrofoil craft of claim 52, wherein the saw-tooth-like shapes form a series of grooves in at least one of the upper and lower surfaces.

55. The hydrofoil craft of claim 52, wherein the saw-tooth-like shapes are u-shaped.

56. The hydrofoil craft of claim 1, wherein the hydrofoil comprises a main hydrofoil, and further comprising at least one tip hydrofoil added to each end of the main hydrofoil for reducing induced drag and for changing flow pattern near each end of the main hydrofoil.

57. The hydrofoil craft of claim 56, wherein at least one tip hydrofoil at each end is angled at least 45 degrees from horizontal.

58. The hydrofoil craft of claim 56, wherein at least one tip hydrofoil at each end is placed at an angle of attack for generate a vortex that spins opposite in direction to a tip vortex generated at each end by the main hydrofoil.

59. The hydrofoil craft of claim 56, wherein at least one surface of at least one tip hydrofoil has a closed cavity for reducing drag.

60. The hydrofoil craft of claim 1, further comprising a leading edge region adjacent the leading edge and a section of the leading edge region that is replaceable.

61. The craft of claim 1, wherein an above-water portion of the craft provides aerodynamic lift, and makes use of the water proximity for further increasing the aerodynamic lift by using a ground effect.

62. A hydrofoil craft comprising at least one hull that lies at least mostly above water, a propulsion system, and at least one strut having an upper end and a lower end, the upper end attached to the at least one hull and the lower end attached to a fully-submerged dynamically-lifting hydrofoil, the hydrofoil comprising a substantially continuous upper surface, a substantially continuous lower surface, a leading edge, a trailing edge, a wetted nose section on the lower surface that extends from the leading edge rearward to a spanwise lower discontinuity for causing a lower boundary layer to separate from the lower surface for forming a lower cavity rearward extending along the lower surface, wherein the nose section comprises an upper surface discontinuity for causing an upper water boundary layer to separate from the upper surface of the hydrofoil for forming an upper cavity rearward extending along the upper surface, at least one gas source, a gas releaser on each surface of the hydrofoil behind each discontinuity for forming the cavities that extend rearward, and a gas flow restrictor communicating with each gas flow releaser for ensuring that each cavity closes ahead of the trailing edge.

63. The hydrofoil craft of claim 62, wherein an angle of the nose section is adjustable.

64. The hydrofoil craft of claim 62, wherein each discontinuity comprises a relatively sharp convex corner.

65. The hydrofoil craft of claim 62, wherein the nose section is angled upward relative to water flow.

66. The hydrofoil craft of claim 65, wherein the nose section is angled approximately perpendicular to the water flow.

67. The hydrofoil craft of claim 62, further comprising at least one trailing edge flap having a trailing edge tab that rotates about an axis near a leading edge of the tab for helping to deflect the at least one flap.

68. The hydrofoil craft of claim 62, wherein the nose section is controllable over at least a portion of a span of the hydrofoil.

69. The hydrofoil craft of claim 62, further comprising a leading edge region having a section that is replaceable.

70. The hydrofoil craft of claim 62, further comprising a trailing edge region having a section that is replaceable.

71. The hydrofoil craft of claim 62, wherein gas is ducted from the lower cavity for supplying gas to the upper cavity.

72. The hydrofoil craft of claim 62, wherein the hydrofoil has an upward or downward dihedral angle.

73. The craft of claim 62, wherein an above-water portion of the craft provides aerodynamic lift, and makes use of water proximity for increasing the aerodynamic lift by using a ground effect.

74. A hydrofoil craft comprising at least one hull that lies at least mostly above water, a propulsion system connected to the craft, at least one strut having an upper end and a lower end, the upper end attached to the at least one hull, a fully-submerged dynamically-lifting hydrofoil attached to the lower end, the hydrofoil comprising an essentially continuous upper surface on a top of the hydrofoil, an upper trailing edge at an aft end of the upper surface, an essentially continuous lower surface on a bottom of the hydrofoil, and a lower trailing edge at an aft end of the lower surface, wherein the surfaces have a common leading edge, further comprising a spanwise discontinuity in each surface near the leading edge of the hydrofoil for causing a local water boundary layer to separate from each surface, at least one gas source connected to the craft, a gas releaser on each surface behind the discontinuity for forming upper and lower cavities that extend rearward, a gas flow restrictor for limiting a gas flow into the upper cavity for ensuring that the upper cavity closes ahead of the upper trailing edge on the upper surface, a gas supply connected to the lower surface for ensuring that the lower cavity on lower surface extends beyond the lower trailing edge on the lower surface, wherein pressure in the upper cavity on the upper surface is lower than pressure in the lower cavity on the lower surface, and wherein most of the upper surface of the hydrofoil lies within the upper cavity.

75. The hydrofoil craft of claim 74, wherein the lower surface includes a nose section with an aft edge and a nose leading edge comprising the leading edge of the hydrofoil, the nose leading edge acting as the discontinuity on the upper surface of the hydrofoil, and the aft edge of the nose section acting as the discontinuity on the lower surface.

76. The hydrofoil craft of claim 75, wherein the nose section is angled upward relative to a hydrofoil centerline that joins the leading edge and the upper trailing edge.

77. The hydrofoil craft of claim 76, wherein a region on the upper surface that extends forward from the upper trailing edge is angled upward at its front end relative to the hydrofoil centerline.

78. The hydrofoil craft of claim 77, wherein a portion of the region on the upper surface is concave in a direction of water flow.

79. A body comprising a low-drag surface-piercing elongated body having opposite sides and a symmetrical and essentially-continuous surface on each side, a leading edge, a trailing edge, an upper body region, a lower body region, an upper discontinuity for separating a water boundary layer near the leading edge in the upper region for forming a rearward-extending air-filled upper cavity on each side that is open to the atmosphere, a lower discontinuity for separating a water boundary layer near the leading edge in the lower region for forming a closed rearward-extending air-filled lower cavity that covers a majority of the surface in the lower region on each side, at least one generally horizontal fence for isolating the lower and upper regions, an air supply connected to the lower cavities, and an airflow restrictor for limiting airflow rate into the lower cavities for ensuring that the lower cavities close ahead of the trailing edge.

80. The body of claim 79, wherein a majority of the trailing edge in the upper region comprises a thick trailing edge, and wherein a majority of the trailing edge in the lower region is relatively sharp.

81. The body of claim 79, further comprising at least one adjustable trailing edge flap that comprises a trailing edge region of the body that extends ahead of the trailing edge over at least a portion of the trailing edge, wherein the flap is deflected for controlling side force.

82. The body of claim 81, wherein the trailing edge flap is quickly moved back and forth from nominal to full position for ensuring a time-averaged contact with a cavity wall on one side.

83. The body of claim 79, further comprising a nose flap on each side of the body, each nose flap having a trailing edge that comprises the discontinuity on that side, wherein each nose flap extends along at least a portion of a span of the body, and wherein each nose flap individually pivots outward from the body about an axis that lies close to the leading edge.

84. The body of claim 83, wherein each nose flap comprises a flexible region near the leading edge that acts as the pivot, and further comprises an essentially rigid portion whose trailing edge includes the discontinuity.

85. The body of claim 79, further comprising at least one above-water hull, a propulsion system, and a lifting hydrofoil that is attached near a lower end of the lower region of the body.

86. The body of claim 85, wherein the hydrofoil has upper and lower surfaces and an air cavity on the upper surface, and wherein pressure in the lower cavity on each side of the body is maintained close to pressure in the cavity on the upper surface of the hydrofoil.

87. The body of claim 85, further comprising an end region that lies immediately below the lower region of the body, wherein at least a majority of the end region is wetted on each side, and wherein the hydrofoil is attached near a bottom of the end region.

88. The body of claim 85, further comprising a debris cutter positioned at an intersection of the body and the hydrofoil.

89. The body of claim 79, further comprising holes in the fence, and wherein air is supplied to the lower cavities through the holes in the fence on each side for limiting airflow rate into the lower cavities.

90. The body of claim 79, wherein the leading edge of the body is swept at least 45 degrees fore or aft.

91. The body of claim 79, further comprising an air duct within the body, and wherein air is supplied to the lower cavities through holes from the air duct inside the body.

92. The body of claim 79, further comprising at least one additional discontinuity on each side in the upper region positioned aft of the discontinuity near the leading edge.

93. The body of claim 79, wherein the body is angled sideways from the vertical.

94. The body of claim 79, wherein the body is tapered in the downward direction.

95. The body of claim 79, wherein the body tapers downward and is swept fore or aft.

96. The body of claim 79, wherein the body has a yaw angle.

97. The body of claim 79, wherein the body telescopes in length.

98. The body of claim 97, further comprising at least one spring connected between telescoping parts of the body for reducing motion in waves, and a damper connected between telescoping parts of the body for damping the motion.

99. The body of claim 97, further comprising at least two such bodies wherein a height of at least one body is varied for turning.

100. The body of claim 79, wherein horizontal cross-sections of the body vary with depth.

101. A hull comprising an elongated low-drag hull having opposite sides, a propulsion system connected to the hull, a symmetrical and essentially-continuous side surface on each of the opposite sides, a leading edge, a trailing edge, a bottom surface, at least one source of pressurized air, multiple vertically-extending discontinuities lying between the leading edge and the trailing edge on each side surface for separating a water boundary layer and forming rearward-extending cavities open to the atmosphere, wherein at least a portion of the hull lies above the water surface, and further comprising at least one pressurized thin air cavity formed on the bottom surface for reducing frictional drag.

102. The hull of claim 101, further comprising an air ejector behind at least one of the discontinuities on each side.

103. The hull of claim 101 wherein the hull lies mostly under a water surface.

104. The hull of claim 101, wherein the hull lies essentially under a water surface, further comprising a thin surface-piercing member with an air duct inside connected to the cavities for providing air for the cavities, and an upper hull side surface having essentially transverse discontinuities for separating a water boundary layer for forming multiple air cavities on the upper side surface filled with air at less than depth pressure.

105. A hydrofoil craft comprising at least one hull that lies at least mostly above water, a propulsion system connected to the hull, at least one strut having an upper end attached to the hull and having a lower end, a fully-submerged dynamically-lifting hydrofoil attached to the lower end, the hydrofoil comprising an essentially continuous upper surface on a top of the hydrofoil and an essentially continuous lower surface on a bottom of the hydrofoil, wherein the upper and lower surfaces have a common leading edge and a common trailing edge, wherein the leading edge is swept at least 45 degrees forward or aft, at least one propulsion drive shaft connected to the propulsion system and located within the at least one strut, at least one essentially horizontal drive shaft connected to at least one propeller attached to at least one end of the at least one horizontal drive shaft.

106. The hydrofoil craft of claim 105, the at least one horizontal drive shaft further comprising at least one set of counter-rotating drive shafts connected to the propulsion drive shaft, at least one set of counter-rotating propellers attached to the at least one set of horizontal counter-rotating drive shafts.

107. The hydrofoil craft of claim 105, further comprising a set of anti-swirl vanes attached in line with the at least one propeller on either side of each propeller.

108. The hydrofoil craft of claim 105, wherein at least one of the propellers is superventilating.

109. The hydrofoil craft of claim 108, wherein the at least one superventilating propeller is ventilated with gas at less than atmospheric pressure.

110. The hydrofoil craft of claim 108, wherein a suction side of the at least one superventilating propeller has a closed cavity at less than depth pressure, and wherein a pressure side of the at least one propeller is superventilated at a pressure greater than that on the suction side.

111. The hydrofoil craft of claim 105, wherein at least one of the propellers is supercavitating.

112. The hydrofoil craft of claim 105, wherein at least one of the propellers is shrouded.

113. The hydrofoil craft of claim 105, wherein the blades of at least one of the propellers are highly swept.

114. The hydrofoil craft of claim 105, wherein at least one strut is swept at least 45 degrees.

115. The hydrofoil craft of claim 105, further comprising bearings and gearing for the drive shafts, and wherein gas used for superventilating each propeller is ducted along each drive shaft, and further serves to cool drive shaft bearings and gearing.

116. The hydrofoil craft of claim 105, further comprising a lower gearbox connected to the drive shaft and wherein the horizontal drive shaft and the lower gearbox are contained within a pod attached to the hydrofoil.

117. The hydrofoil craft of claim 105, further including an underwater sound transmitter attached to the craft for transmitting a sound beam forward of the craft for frightening sea animals away from a path of the hydrofoil.

118. A hydrofoil craft comprising at least one hull that lies at least mostly above water, a propulsion system connected to the hull, and at least one strut having an upper end attached to the hull and having a lower end, a fully-submerged dynamically-lifting hydrofoil attached to the lower end, the hydrofoil comprising an essentially continuous upper surface on a top of the hydrofoil and an essentially continuous lower surface on a bottom of the hydrofoil, wherein the hydrofoil surfaces have a common leading edge and a common trailing edge, wherein the leading edge of the hydrofoil is swept forward or aft at least 45 degrees, and wherein the propulsion system comprises at least one propulsion drive shaft connected to at least one propeller.

119. The hydrofoil craft of claim 118, wherein the at least one drive shaft is angled downward and rearward from the at least one hull.

120. The hydrofoil craft of claim 118, wherein the at least one propeller is an air propeller.

121. The hydrofoil craft of claim 118, wherein at least one of the hydrofoil surfaces has a closed gas cavity for reducing drag.

122. The hydrofoil craft of claim 118, wherein the at least one propeller is submerged and comprises propeller blades that have opposite sides and at least one closed gas cavity on at least one of the sides for reducing drag.

123. The hydrofoil craft of claim 122, wherein the at least one propeller has a closed cavity on each side for reducing drag.

124. The hydrofoil craft of claim 122, further comprising a pod attached to the hydrofoil wherein the propulsion system comprises at least one electric motor housed within the pod for powering the at least one propeller.

125. Apparatus for reducing drag comprising an essentially continuous underwater surface, a trailing edge of the surface, at least one discontinuity on the surface angled to water flow along the surface for separating a water boundary layer from the surface, at least one gas source, a gas releaser behind the discontinuity for forming a cavity that extends rearward on the surface from the discontinuity, a gas flow limiter connected to the gas releaser for limiting gas flow into the cavity for ensuring that the cavity closes ahead of a trailing edge of the surface without gas being artificially withdrawn from the cavity, wherein the surface is shaped in a desired cavity termination region for a minimum of a cavity contact angle, wherein at least a portion of the surface that lies behind the desired cavity termination region is shaped for increasing the cavity contact angle in case the cavity extends beyond the desired termination region.

126. The apparatus of claim 125, wherein the discontinuity is a protuberance from the surface.

127. The apparatus of claim 126, wherein the protuberance is a plate extending outward from the surface at an angle to the surface.

128. The apparatus of claim 127, wherein the angle of the plate is controllable for changing a size of the cavity.

129. The apparatus of claim 128, wherein the angle of the plate is about 90 degrees to the oncoming water flow.

130. The apparatus of claim 127, wherein the plate is angled approximately perpendicular to the surface.

131. The apparatus of claim 130, wherein a height of the plate is controllable for changing a size of the cavity.

132. The apparatus of claim 125, wherein the discontinuity is an inward step in the surface.

133. The apparatus of claim 125, wherein the discontinuity is a relatively sharp convex angle in the surface.

134. The apparatus of claim 125, wherein the discontinuity is a slot through which gas is released.

135. The apparatus of claim 125, wherein at least a part of the portion of the surface lying behind the desired cavity termination region is concave in the direction of water flow.

136. The apparatus of claim 125, wherein the gas releaser comprises holes in the surface placed behind the discontinuity.

137. The apparatus of claim 136, further comprising an essentially rearward-facing flap placed over at least one of the holes.

138. The apparatus of claim 137, wherein the flap comprises a one-way valve for opening only when gas is released.

139. The apparatus of claim 125, wherein at least some of the gas is released within a region of the separated water boundary layer.

140. The apparatus of claim 125, wherein the gas flow limiter comprises a valve for controlling gas flow rate.

141. The apparatus of claim 125, wherein the gas flow limiter comprises a restriction in a duct for supplying gas to the cavity.

142. The apparatus of claim 125, further comprising a fence for separating adjacent gas cavities.

143. The method of reducing drag on an essentially continuous underwater surface comprising providing a surface discontinuity on the surface that is angled to water flow along the surface, separating a water boundary layer from the surface, providing at least one gas source, releasing gas behind the discontinuity, forming a cavity, extending the cavity rearward from the discontinuity, limiting gas flow rate into the cavity, ensuring that the cavity closes ahead of a trailing edge of the surface without gas being artificially withdrawn from the cavity, wherein providing the discontinuity comprises providing and angling the plate about 90 degrees to the surface.

144. The method of claim 143, further comprising controlling height of the plate and changing size of the cavity.

145. The method of closing a gas cavity comprising providing a moving underwater surface, providing gas to the surface, forming a gas cavity on the surface, providing a cross section of the surface transverse to water flow over the surface, providing a desired cavity closure in a cavity closure region, providing a series of substantially symmetrical saw-tooth shapes on the surface in a cross section of the cavity closure region for directing splash sideward and rearward, and for reducing disturbances and drag at the cavity closure due to splash, wherein the saw-tooth shapes comprise contiguous v-shapes or u-shapes.

146. The method of claim 145, wherein the providing the saw-tooth-like shapes comprises forming a series of parallel ridges in the cavity closure region and angling the parallel ridges to within 30 degrees of a water flow direction.

147. The method of claim 146, further comprising providing height of the ridges less than a maximum cavity thickness ahead of the cavity closure region.

148. The method of claim 147, wherein the providing the ridges comprises providing ridges on an outer surface of a film and attaching the film to the underwater surface in the cavity closure region.

149. The method of claim 145, wherein the providing the saw-tooth-like shapes comprises forming a series of grooves in the underwater surface and angling the grooves within about 30 degrees of the water flow.

150. The method of claim 145 further comprising providing each saw-tooth-like shape with sides deviating from straight lines.

151. The method of claim 145, wherein the providing saw-tooth-like shapes comprises providing u-shapes.

152. The method for reducing drag on a hydrofoil comprising providing a hydrofoil, providing an essentially continuous upper surface on a top of the hydrofoil, providing an essentially continuous lower surface on a bottom of the hydrofoil, joining the surfaces at a common leading edge and at a common trailing edge, providing a discontinuity, extending the discontinuity at least partially in a spanwise direction on at least one of the surfaces near the leading edge, separating a water boundary layer from the at least one of the surfaces, providing at least one gas source, releasing gas behind the discontinuity, forming a gas cavity, extending the gas cavity rearward from the discontinuity, limiting gas flow rate into the cavity, closing the cavity ahead of the trailing edge, shaping the at least one of the surfaces in a desired cavity termination region for a minimum cavity contact angle, providing at least a portion of the at least one of the surfaces that lies behind the desired cavity termination region with a shape for increasing the cavity contact angle in case the cavity extends beyond the desired termination region.

153. The method of claim 152, wherein the providing a discontinuity comprises providing a protuberance from the at least one of the surfaces.

154. The method of claim 153, wherein the providing the protuberance comprises providing a plate extending outward from the surfaces at an angle to the surfaces.

155. The method of claim 154, further comprising angling the plate approximately perpendicular to the surface.

156. The method of claim 155, further comprising controlling height of the plate and changing size of the cavity.

157. The method of claim 154, wherein the angling of the plate comprises controlling the angling for changing size of the cavity.

158. The method of claim 152, wherein the providing of the discontinuity comprises providing an inward step in the at least one of the surfaces.

159. The method of claim 152, wherein the providing the discontinuity comprises providing a relatively sharp convex angle in the at least one of the surfaces.

160. The method of claim 152, wherein the providing the discontinuity comprises providing a slot and the releasing gas comprises releasing gas from the slot.

161. The method of claim 152, wherein the providing of at least a portion of the surface lying behind the desired cavity termination region comprises providing the at least a portion with a concave shape in a direction of water flow.

162. The method of claim 152, wherein the releasing gas comprises releasing gas into the cavity through holes in the surface behind the discontinuity.

163. The method of claim 162, further comprising providing an essentially rearward-facing flap over at least one of the holes.

164. The method of claim 163, wherein the providing the flap comprises providing a one-way valve and opening the valve only when gas is released.

165. The method of claim 152, wherein the releasing gas comprises releasing at least some of the gas within a region of the separated water boundary layer.

166. The method of claim 152, further comprising angling the discontinuity at about 90 degrees to water flow.

167. The method of claim 152, wherein the limiting comprises providing and controlling gas flow rate.

168. The method of claim 152, wherein the limiting comprises providing a restriction in a duct supplying gas to the cavity.

169. The method of claim 152, further comprising providing an adjacent gas cavity adjacent to the cavity and providing an approximately fore-and aft fence, and separating the adjacent cavity with the fence.

170. The method of claim 152, wherein the providing of a hydrofoil comprises providing a main hydrofoil providing at least one tip hydrofoil on each end of the hydrofoil and reducing induced drag and changing flow pattern near each end of the main hydrofoil.

171. The method of claim 170, further comprising wetting each surface of the tip hydrofoil.

172. The method of claim 170, further comprising providing a closed cavity on at least one side of each tip hydrofoil for reducing drag.

173. The method of claim 170, further comprising angling each tip hydrofoil at least 45 degrees from horizontal.

174. The method of claim 170, further comprising angling each tip hydrofoil at an angle of attack and generating a water vortex spinning in a direction opposite to a tip vortex generated by the main hydrofoil.

175. The method of reducing drag on a hydrofoil comprising providing an essentially continuous upper surface on a top of the hydrofoil, providing an essentially continuous lower surface on a bottom of the hydrofoil, providing the surfaces with a common leading edge and a common trailing edge, providing a spanwise discontinuity in each surface near the leading edge, causing local boundary layer, separating water flow from the surfaces, providing the lower surface with a spanwise nose section wherein the nose section provides the leading edge and provides the discontinuity on the upper surface of the hydrofoil, and providing a aft edge of the nose section which provides the discontinuity on the lower surface, providing at least one gas source, releasing gas behind the discontinuity on each surface forming cavities on the surfaces, extending the cavities rearward from the discontinuities, limiting gas flow rate into at least one cavity to ensure that it closes ahead of the trailing edge.

176. The method of claim 175, further comprising angling the nose section upward at a forward end thereof relative to a hydrofoil centerline.

177. The method of claim 176, further comprising providing a curve in a surface of the nose section.

178. The method of claim 176, wherein providing the nose section comprises providing an essentially flat spanwise plate and orienting the plate essentially perpendicular to approaching water flow.

179. The method of claim 175, further comprising providing a region on the upper surface extending forward from the trailing edge and angling the region upward relative to a hydrofoil centerline.

180. The method of claim 179, further comprising providing an aft portion of the region with a concave curvature.

181. The method of claim 175, further comprising providing the hydrofoil with a v-shaped planform, and sweeping the leading edge at least 45 degrees fore or aft.

182. The method of supplying gas into a gas cavity on a hydrofoil surface, comprising providing a lifting hydrofoil, providing a gas cavity on the hydrofoil, providing a gas source, flowing gas from the gas source through a spanwise duct in a strut that is attached to a hydrofoil, through at least one opening in the hydrofoil in a strut attachment region into a spanwise duct in the hydrofoil, and through at least one other opening in the hydrofoil into the cavity.

183. The method of claim 182, wherein the flowing of gas through the at least one other opening into the cavity flowing the gas through a one-way valve and preventing water from entering the hydrofoil duct.

184. The method of claim 183, wherein the flowing gas through the one-way valve comprises flowing the gas from under a flap that covers a hole and hinging the flap on an upstream side.

185. The method of claim 182, wherein the flowing comprises passing the gas from the spanwise duct in the hydrofoil through a permeable wall into a second spanwise duct in the hydrofoil before flowing the gas through the at least one other opening into the cavity.

186. The method of claim 185, wherein flowing through the permeable wall comprises flowing the gas through a porous material.

187. The method of claim 185, wherein flowing the gas through the permeable wall comprises flowing the gas through at least one hole in a solid wall.

188. The method of claim 182, wherein flowing the gas comprises flowing a portion of the gas through a permeable wall in one end of the spanwise hydrofoil duct into an extension of the spanwise hydrofoil duct before entering an opening into a second gas cavity on the hydrofoil surface.

189. The method of claim 182, further comprising providing gas flow rate into the cavity with a controller.

190. The method of claim 182, further comprising controlling a gas flow rate into the cavity with a pressure of the gas source and sizes of the openings.

191. The method of claim 182, wherein the providing the gas source comprises providing air at atmospheric pressure.

192. A hydrofoil method comprising supplying gas into gas cavities on the upper and lower surfaces of a hydrofoil, by flowing the gas from multiple gas sources through multiple spanwise ducts in at least one strut that is attached to the hydrofoil, through multiple openings in the hydrofoil at strut attachment regions into multiple spanwise ducts in the hydrofoil, and through multiple openings in the hydrofoil into the cavities.

193. A hydrofoil craft comprising at least one hull that lies at least mostly above water, a propulsion system, at least one strut having an upper end attached to a hull and having a lower end, a fully-submerged dynamically-lifting hydrofoil attached to the lower end, an essentially continuous upper surface on a top of the hydrofoil and an essentially continuous lower surface on a bottom of the hydrofoil, wherein the surfaces have a common leading edge and a common trailing edge, further comprising a spanwise discontinuity on at least one of the surfaces near the leading edge for causing a local water boundary layer to separate, at least one gas source, a gas releaser behind the discontinuity for forming a cavity that extends rearward, a gas flow limiter for limiting a gas flow rate into the cavity for ensuring that the cavity closes ahead of the trailing edge, wherein most of the surface of the hydrofoil on the cavity side lies within the cavity, and wherein the hydrofoil craft further comprises a bow lifter positioned near a front of the craft for stabilizing the craft in at least heave and pitch.

194. The craft of claim 193, wherein the bow lifter comprises an inverted v-hydrofoil having foil tip regions for piercing a water surface at speed.

195. The craft of claim 194, wherein the inverted v-hydrofoil is superventilated on an upper surface.

196. The craft of claim 194, wherein the inverted v-hydrofoil is superventilated on a lower surface.

197. The craft of claim 194, wherein the inverted v-hydrofoil is swept back.

198. The craft of claim 193, wherein the bow lifter comprises a swept back v-hydrofoil that has negative dihedral and foil tip regions that pierce a water surface at speed.

199. The craft of claim 193, wherein the bow lifter comprises two surface-piercing v-hydrofoils.

200. The craft of claim 199, wherein at least one of two surfaces on each v-hydrofoil is superventilated.

201. The craft of claim 193, wherein the bow lifter comprises a set of side-by-side flexible planing plates wherein an angle of attack of each planing plate reduces as its lift increases.

202. A hydrofoil craft comprising at least one hull that lies at least mostly above water, a propulsion system, at least one strut having an upper end attached to a hull having a lower end, a fully-submerged dynamically-lifting v-hydrofoil in plan view attached to the lower end, the v-hydrofoil having leading edges swept at least 45 degrees, the craft further comprising a bow lifter positioned near a front of the craft for dynamically stabilizing the craft in at least heave and pitch.

203. The craft of claim 202, wherein the bow lifter comprises a swept back v-hydrofoil in plan view having negative dihedral and foil tip regions that pierce the water surface at a design speed.

204. A hydrofoil craft comprising at least one hull that lies at least mostly above water, a propulsion system, a dynamically-lifting hydrofoil for helping to lift at least most of a weight of the craft, the lifting hydrofoil comprising an essentially continuous upper surface on a top of the hydrofoil and an essentially continuous lower surface on a bottom of the hydrofoil, wherein the surfaces have a common leading edge and a common trailing edge, further comprising a spanwise discontinuity on at least a portion of at least one surface near the leading edge for causing a local water boundary layer to separate, at least one gas source, a gas releaser behind the discontinuity for forming a cavity that extends rearward, a gas flow limiter for limiting a gas flow rate into the cavity for ensuring that the cavity closes ahead of the trailing edge, an angled upward tip region at each end of the lifting hydrofoil for piercing a water surface and for attaching to the one or more above-water hulls.

205. The craft of claim 204, wherein the lifting hydrofoil leading edge is v-shaped in plan view, and is swept at least 45 degrees forward or aft.

206. The craft of claim 204, wherein at least a portion of the tip region is wetted on both sides.

207. The craft of claim 204, wherein at least a portion of the tip region is superventilated on one side.

208. The craft of claim 204, wherein at least a portion of the tip region has a closed cavity on one side.

209. The craft of claim 204, wherein at least one fence is positioned underwater in each tip region.

210. The craft of claim 204, wherein each tip region is lifting for dynamically stabilizing craft roll.

211. The craft of claim 210, wherein the tip regions also dynamically stabilize hydrofoil depth.

212. The craft of claim 210, wherein the hydrofoil leading edge is swept forward on each side and tip regions also dynamically stabilize craft pitch and depth.

213. The craft of claim 210, further comprising a hydrodynamic lifter at a bow of the craft for dynamically stabilizing the craft in pitch and depth.

214. A hydrofoil craft comprising at least one hull that lies at least mostly above water, a propulsion system, a dynamically-lifting hydrofoil for helping to lift at least most of the weight of the craft, the hydrofoil comprising an essentially continuous upper surface on a top of the hydrofoil and an essentially continuous lower surface on a bottom of the hydrofoil, wherein the surfaces have a common leading edge and a common trailing edge, a spanwise discontinuity on at least a portion of at least one of the surfaces near the leading edge for causing a local water boundary layer to separate, at least one gas source, a gas releaser behind the discontinuity for forming a cavity that extends rearward, a gas flow limiter connected to the gas releaser for limiting a gas flow rate into the cavity for ensuring that the cavity closes ahead of the trailing edge, a hydrofoil tip on each side of the hydrofoil, a strut attached inboard of a hydrofoil tip on each side for connecting the hydrofoil to the one or more hulls, wherein each strut is angled from vertical, and wherein each strut provides lift for dynamically stabilizing the craft in roll.

215. The craft of claim 214, wherein each strut is angled outward from vertical for helping the craft bank inward when turning.

216. The craft of claim 214, further comprising a hydrodynamic lifter at a bow of the craft for dynamically stabilizing craft pitch.

217. A hydrofoil craft comprising at least one hull that lies at least mostly above water, a propulsion system, a dynamically-lifting hydrofoil for helping to lift part of the weight of the craft, the hydrofoil comprising an essentially continuous upper surface on a top of the hydrofoil and an essentially continuous lower surface on a bottom of the hydrofoil, wherein the surfaces have a common leading edge and a common trailing edge, a spanwise discontinuity on at least a portion of at least one of the surfaces near the leading edge for causing a local water boundary layer to separate, at least one gas source, a gas releaser behind the discontinuity for forming a cavity that extends rearward, a gas flow limiter connected to the gas releaser for limiting a gas flow rate into the cavity for ensuring that the cavity closes ahead of the trailing edge, wherein an above-water portion of the craft provides aerodynamic lift and makes use of water proximity for further increasing the aerodynamic lift by using a surface effect.

218. The craft of claim 217, further comprising an aft air stabilizer for aerodynamically stabilizing the craft in pitch.

219. The craft of claim 217, wherein a center of aerodynamic lift lies vertically near a center of gravity of the craft.

220. The hydrofoil craft of claim 217, wherein a plan form of the leading edge of the hydrofoil is v-shaped and is swept at least 45 degrees back or forward.

221. A hydrofoil craft comprising at least one hull that lies at least mostly above water, a propulsion system, and at least one strut whose upper end is attached to the at least one hull and whose lower end is attached to a fully-submerged hydrofoil, the hydrofoil further comprising a leading edge and a trailing edge, a substantially continuous upper surface and a substantially continuous lower surface, a spanwise discontinuity in the lower surface near the leading edge for causing a local water boundary layer to separate from the surface, at least one gas source, a gas releaser behind the discontinuity for forming a lower cavity that extends rearward beyond the trailing edge on the lower surface, and further comprising a cavity on each side of the at least one strut.

222. The hydrofoil craft of claim 221, further comprising an upper surface discontinuity near the leading edge, and an upper cavity extending rearward from the upper surface discontinuity toward the trailing edge.

223. The hydrofoil craft of claim 221, further comprising an upper surface discontinuity near the leading edge, and an upper cavity extending rearward from the upper surface discontinuity to near the trailing edge.

\* \* \* \* \*

UNITED STATES PATENT AND TRADEMARK OFFICE
CERTIFICATE OF CORRECTION

PATENT NO. : 6,901,873 B1
DATED : June 7, 2005
INVENTOR(S) : Thomas G. Lang and James T. Lang It is certified that error appears in the above-identified patent and that said Letters Patent is hereby corrected as shown below:

Title page,
Item [76], Inventors, the street address of the second inventor should read:
-- 559 Homer Avenue --.

Signed and Sealed this

Thirtieth Day of August, 2005

JON W. DUDAS
*Director of the United States Patent and Trademark Office*